US009312054B2

(12) United States Patent
Watanabe et al.

(10) Patent No.: US 9,312,054 B2
(45) Date of Patent: Apr. 12, 2016

(54) THERMISTOR ELEMENT, TEMPERATURE SENSOR, AND METHOD FOR MANUFACTURING THE THERMISTOR ELEMENT

(71) Applicant: NGK SPARK PLUG CO., LTD., Nagoya (JP)

(72) Inventors: Hiroshi Watanabe, Nagoya (JP); Yasuyuki Okimura, Inuyama (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 84 days.

(21) Appl. No.: 14/199,055

(22) Filed: Mar. 6, 2014

(65) Prior Publication Data

US 2014/0266567 A1    Sep. 18, 2014

(30) Foreign Application Priority Data

Mar. 12, 2013  (JP) .................................. 2013-049504
Dec. 3, 2013  (JP) .................................. 2013-250549

(51) Int. Cl.
| H01C 7/10 | (2006.01) |
| H01C 1/02 | (2006.01) |
| H01C 7/00 | (2006.01) |
| H01C 1/032 | (2006.01) |
| H01C 17/02 | (2006.01) |
| G01K 7/22 | (2006.01) |
| H01C 7/04 | (2006.01) |

(52) U.S. Cl.
CPC .. *H01C 1/02* (2013.01); *G01K 7/22* (2013.01); *H01C 1/032* (2013.01); *H01C 7/008* (2013.01); *H01C 17/02* (2013.01); *G01K 2205/04* (2013.01); *H01C 7/04* (2013.01); *Y10T 29/49085* (2015.01)

(58) Field of Classification Search
CPC ........ H01C 7/008; H01C 7/021; H01C 17/02; H01C 1/02; H01C 1/032; H01C 1/148; H01C 7/04

USPC ............................... 338/20, 22 R, 28; 29/612
See application file for complete search history.

(56) References Cited

U.S. PATENT DOCUMENTS 3,815,074 A     6/1974  Nagata
7,056,453 B2 *  6/2006  Ogata et al. ................. 252/518.1
(Continued)

FOREIGN PATENT DOCUMENTS

JP     08-162302 A    6/1996
JP     4990256 B      8/2012

OTHER PUBLICATIONS

Extended European Search Report mailed Jul. 30, 2014 for the corresponding European Application No. 14158942.4.

*Primary Examiner* — Kyung Lee
(74) *Attorney, Agent, or Firm* — Leason Ellis LLP

(57) ABSTRACT

A thermistor element includes a thermistor main body having a rectangular parallelepiped shape, and a first covering layer having reduction resistance and covering the periphery of the thermistor main body. At least a portion (exposed outer surface) of the outer surface of the first covering layer is exposed to the outside. When the shortest distance in a straight line in the first covering layer extending from a starting point on the thermistor main body to the exposed outer surface is defined as an exposed layer thickness at the starting point, the first covering layer is formed such that an exposed layer thickness measured by using any vertex of the rectangular parallelepiped thermistor main body as a starting point is equal to or greater than the smallest one of exposed layer thicknesses measured by using points on three sides and three flat surfaces which form the vertex.

13 Claims, 10 Drawing Sheets

(56) References Cited

U.S. PATENT DOCUMENTS

| | | | |
|---|---|---|---|
| 7,633,371 B2* | 12/2009 | Mizoguchi et al. | 338/22 R |
| 2002/0135455 A1 | 9/2002 | Murata et al. | |
| 2002/0172258 A1 | 11/2002 | Adachi et al. | |
| 2013/0186881 A1* | 7/2013 | Nakayama et al. | 219/494 |
| 2013/0223479 A1* | 8/2013 | Satou et al. | 374/163 |
| 2014/0266567 A1* | 9/2014 | Watanabe et al. | 338/22 R |

* cited by examiner

THERMISTOR ELEMENT, TEMPERATURE SENSOR, AND METHOD FOR MANUFACTURING THE THERMISTOR ELEMENT

This application claims the benefit of Japanese Patent Applications No. 2013-049504, filed Mar. 12, 2013 and No. 2013-250549, filed Dec. 3, 2013, which are incorporated by reference in their entity herein.

FIELD OF THE INVENTION

The present invention relates to a thermistor element including a thermistor main body formed of an electrically conductive sintered oxide which has electrical conductivity and whose resistance changes with temperature, and to a temperature sensor using the same. Also, the present invention relates to a method for manufacturing such a thermistor element

BACKGROUND OF THE INVENTION

Conventionally, there have been known a thermistor element which performs temperature measurement through use of a thermistor main body formed of an electrically conductive sintered oxide which has electrical conductivity and whose resistance changes with temperature, and a temperature sensor using such a thermistor element. For example, Japanese Patent No. 4990256 discloses a temperature sensing device (thermistor element) in which a temperature sensing element (thermistor main body) having a rectangular parallelepiped shape is covered and sealed with an inner protection layer (first covering layer). In Japanese Patent No. 4990256, a temperature sensing element having electrode wires (leads) joined thereto in advance is dipped into a glass paste prepared by mixing powder of crystallized glass and solvent such that the glass paste adheres to the temperature sensing element, followed by heat treatment, whereby an inner protection layer is formed.

Problems to be Solved by the Invention

In the case of this temperature sensing device (thermistor element), since the inner protection layer (first covering layer) is formed by dipping the temperature sensing element (thermistor main body) into paste as described above, the inner protection layer has a flattened spherical outer shape (spheroidal outer shape). Therefore, the inner protection layer becomes relatively thin at the vertexes (corners) of the temperature sensing element having a rectangular parallelepiped shape, although it can have a sufficiently large thickness on the flat outer surfaces of the thermistor sensing element.

If the thickness of the inner protection layer at the vertexes of the temperature sensing element is small, the performance in preventing invasion of reducing gases becomes poor at the vertexes. Therefore, for example, in Patent Document 1, the entire inner protection layer is covered with an outer protection layer so as to prevent invasion of reducing gases. However, when the covering layer is composed of two layers; i.e., the inner protection layer and the outer protection layer, there arise problems, such as generation of stress due to a difference in thermal expansion and contraction between the inner protection layer and the outer protection layer, and a decrease in thermal responsiveness of the thermistor element.

SUMMARY OF THE INVENTION

The present invention has been accomplished in view of the above-described problems, and its object is to provide a thermistor element which properly restrains invasion of reducing gases into its thermistor main body over the entire surface thereof by a single covering layer, and to provide a temperature sensor using such a thermistor element. Another object of the present invention is to provide a method for manufacturing such a thermistor element.

Means for Solving the Problems

One mode of the present invention is a thermistor element comprising a thermistor main body made of an electrically conductive sintered oxide and having a rectangular parallelepiped shape; and a first covering layer which has reduction resistance, which covers a periphery of the thermistor main body, and which has an outer surface, at least a portion of which is an exposed outer surface exposed to the outside, wherein when the shortest distance in a straight line in the first covering layer extending from a starting point on the thermistor main body to the exposed outer surface is defined as an exposed layer thickness at the starting point, the first covering layer is formed such that an exposed layer thickness measured by using any vertex of the rectangular parallelepiped thermistor main body as a starting point is equal to or greater than the smallest one of exposed layer thicknesses measured by using, as starting points, points which are other than the vertex and are located on three sides and three flat surfaces which form the vertex.

In the above-described thermistor element, the exposed layer thickness measured by using any vertex of the rectangular parallelepiped thermistor main body as a starting point is equal to or greater than the smallest one of exposed layer thicknesses measured by using, as starting points, points (excluding the vertex) on the three sides and three flat surfaces which form the vertex. Therefore, through provision of the single first covering layer, invasion of reducing gases toward any portion of the thermistor main body (including the case where reducing gases invade toward the vertexes of the thermistor main body) can be properly restrained over the entire surface of the thermistor element.

Notably, a vertex of a rectangular parallelepiped refers to a point which is shared by three sides; i.e., a point where three ridge lines of the thermistor element having a rectangular parallelepiped shape meet.

Preferably, the above-described thermistor element further comprises leads which are connected to the thermistor main body and which extend through the first covering layer and project therefrom; and a second covering layer which has reduction resistance and which is formed of a material different from the material of the first covering layer, wherein the second covering layer covers a portion of each lead and a portion of the first covering layer to thereby airtightly close interfaces between the leads and the first covering layer.

In the case where the thermistor element has leads which are connected to the thermistor main body and which extend through the first covering layer and project therefrom, reducing gases are more likely to invade through the interfaces between the leads and the first covering layer.

In the above-described thermistor element, the second covering layer covers a portion of each lead and a portion of the first covering layer to thereby airtightly close the interfaces. Therefore, invasion of reducing gases through the interfaces between the first covering layer and the leads can be properly prevented by the second covering layer.

Notably, an example of the form in which the second covering layer covers a portion of each lead and a portion of the first covering layer to thereby airtightly close the interfaces is a form in which the second covering layer covers a part of an extension portion of each lead projecting from the first covering layer, the part being located adjacent to the first covering layer; i.e., an adjacently existing part of the extension portion located adjacent to the first covering layer, and a surrounding outer surface portion of the outer surface of the first covering layer, which is located around the adjacently existing part.

In the above-described thermistor element, preferably, the leads are a pair of leads which are respectively connected to facing surfaces of the thermistor main body facing each other via one end surface of the thermistor main body and which extend in the same direction beyond the end surface; and the second covering layer is formed within an extension-side outer surface which is a portion of the outer surface of the first covering layer and which is located outward of the end surface with respect to the extending direction of the leads.

In the above-described thermistor element, the second covering layer is formed within the extension-side outer surface which is a portion of the outer surface of the first covering layer and which is located outward of the above-mentioned end surface with respect to the extending direction of the leads. Therefore, the thermistor element can have a higher thermal responsiveness, as compared with a thermistor element in which the second covering layer is also formed on an outer surface which is located on the thermistor main body side of the above-mentioned end surface (on the side opposite the extending direction).

Notably, the one end surface of the thermistor main body refers to a surface (first side surface) which is one of the four surfaces (side surfaces) which connect the two facing surfaces and which is located on one side of the thermistor main body toward which the leads project in the extending direction.

In any of the above-described thermistor elements, preferably, a relation of X1>X2 and a relation of X3>X2 are satisfied, where X1 represents the coefficient of thermal expansion of the first covering layer, X2 represents the coefficient of thermal expansion of the second covering layer, and X3 represents the coefficient of thermal expansion of the leads.

In the above-described thermistor element, the coefficient of thermal expansion X2 of the second covering layer is smaller than the coefficient of thermal expansion X1 of the first covering layer, and is smaller than the coefficient of thermal expansion X3 of the leads. Accordingly, after firing, a compress stress acts on the second covering layer, whereby cracking of the second covering layer can be restrained. Accordingly, the thermistor element can reliably restrain invasion of reducing gases through the interfaces between the first covering layer and the leads.

In the above-described thermistor element, preferably, the difference (X1−X2) between the coefficient of thermal expansion X1 of the first covering layer and the coefficient of thermal expansion X2 of the second covering layer satisfies a relation of $(X1-X2) \leq 15 \times 10^{-7}/°C$; and the difference (X3−X2) between the coefficient of thermal expansion X3 of the leads and the coefficient of thermal expansion X2 of the second covering layer satisfies a relation of $(X3-X2) \leq 15 \times 10^{-7}/°C$.

In the above-described thermistor element, the difference (X1−X2) is equal to or smaller than $15 \times 10^{-7}/°C$, and the difference (X3−X2) is equal to or smaller than $15 \times 10^{-7}/°C$. Namely, the coefficients of thermal expansion X1, X2, X3 of the first covering layer, the second covering layer, and the leads differ from one another only slightly. Accordingly, even when the environment temperature of the thermistor element changes, formation of a clearance or separation (cracking) is less likely to occur between the first covering layer and the second covering layer or between the leads and the second covering layer. Therefore, in the thermistor element, the adjacently existing parts of the leads and the surrounding outer surface portion of the first covering layer are reliably sealed by the second covering layer.

In any of the above-described thermistor elements, preferably, the second covering layer is formed of glass or a mixture of glass and metal oxide particles.

In the above-described thermistor element, since the second covering layer is formed of glass or a mixture of glass and metal oxide particles, invasion of reducing gases through the interfaces between the first covering layer and the leads can be reliably prevented by the second covering layer.

Notably, examples of the material of glass used for forming the second covering layer include crystallized glass formed of $SiO_2$—RO—$B_2O_3$ (R: alkaline earth metal), $SiO_2$—RO—$Al_2O_3$, $SiO_2$—RO—$Al_2O_3$—$ZrO_2$, $SiO_2$—RO—ZnO, $SiO_2$—RO—$TiO_2$, $SiO_2$—$B_2O_3$—$Al_2O_3$, or $SiO_2$—$B_2O_3$—ZnO, and amorphous glass formed of $SiO_2$—RO, $SiO_2$—RO—$B_2O_3$, $SiO_2$—RO—$Al_2O_3$, or $SiO_2$—RO—$Al_2O_3$—$ZrO_2$. Notably, as compared with crystallized glass, amorphous glass more easily softens and flows at the time of firing and fills the interfaces between the first covering layer and the leads. Therefore, it is more preferred to use amorphous glass for the second covering layer. Also, examples of the material of the metal oxide particles include yttrium oxide ($Y_2O_3$) and aluminum oxide ($Al_2O_3$).

In the above-described thermistor element, preferably, the glass which forms the second covering layer is amorphous glass.

In the above-described thermistor element, the glass which forms the second covering layer is amorphous glass. As compared with crystallized glass, amorphous glass more easily softens and flows at the time of firing and fills the interfaces between the first covering layer and the leads. Therefore, invasion of reducing gases through the interfaces between the first covering layer and the leads can be reliably prevented by the second covering layer.

In any of the above-described thermistor elements, preferably, the first covering layer is formed of glass or a mixture of glass and metal oxide particles.

In the above-described thermistor element, the first covering layer is formed of glass or a mixture of glass and metal oxide particles. Therefore, through provision of the single first covering layer, invasion of reducing gases toward the thermistor main body, including the vertexes thereof, can be reliably restrained over the entire surface of the thermistor element.

Notably, example of the material of glass used for forming the first covering layer include crystallized glass formed of $SiO_2$—RO—$B_2O_3$ (R: alkaline earth metal), $SiO_2$—RO—$Al_2O_3$, $SiO_2$—RO—ZnO, $SiO_2$—RO—$Al_2O_3$—$ZrO_2$, $SiO_2$—RO—$TiO_2$, $SiO_2$—$B_2O_3$—$Al_2O_3$, or $SiO_2$—$B_2O_3$—ZnO and amorphous glass formed of $SiO_2$—RO—$SiO_2$—RO—$B_2O_3$, $SiO_2$—RO—$Al_2O_3$, or $SiO_2$—RO—$Al_2O_3$—$ZrO_2$. Notably, since crystallized glass is higher in heat resistance than amorphous glass, it is more preferred to use crystallized glass for the first covering layer. Also, examples of the material of the metal oxide particles include yttrium oxide ($Y_2O_2$) and aluminum oxide ($Al_2O_3$).

In the above-described thermistor element, preferably, the glass which forms the first covering layer is crystallized glass.

In the above-described thermistor element, the glass which forms the first covering layer is crystallized glass. Since the heat resistance of crystallized glass is generally higher than that of amorphous glass, by using crystallized glass as the glass which forms the first covering layer, it becomes possible to secure the high temperature reliability of the thermistor main body; i.e., the reliability of the thermistor main body against high temperature to which the thermistor main body is exposed through the first covering layer.

Also, since the heat resistance of crystallized glass is generally higher than that of amorphous glass, by using crystallized glass as the glass which forms the first covering layer, it becomes possible to promote transfer of heat to the thermistor main body though the first covering layer. Therefore, the thermistor element can have high thermal responsiveness easily.

In any of the above-described thermistor elements, preferably, the first covering layer has a rectangular parallelepiped outer shape, and has flat surfaces parallel to flat surfaces of the rectangular parallelepiped thermistor main body.

In the above-described thermistor element, since the first covering layer has a rectangular parallelepiped outer shape, and has flat surfaces parallel to the flat surfaces of the rectangular parallelepiped thermistor main body, the exposed layer thickness measured by using each vertex as a starting point can be reliably made equal to or greater than the exposed layer thicknesses measured by using points on the sides and the flat surfaces as starting points. Therefore, through provision of the single first covering layer, invasion of reducing gases toward the thermistor main body can be reliably restrained over the entire surface of the thermistor element.

In any of the above-described thermistor elements, preferably, the first covering layer has a circular columnar outer shape, and has a pair of flat surfaces which are parallel to a pair of flat surfaces of the rectangular parallelepiped thermistor main body which face each other.

In the above-described thermistor element, since the first covering layer has a circular columnar outer shape, and has a pair of flat surfaces which are parallel to a pair of flat surfaces of the thermistor main body which face each other, the exposed layer thickness measured by using each vertex as a starting point can be reliably made equal to or greater than the exposed layer thicknesses measured by using points on the sides and the flat surfaces as starting points. Therefore, through provision of the single first covering layer, invasion of reducing gases toward the thermistor main body can be reliably restrained over the entire surface of the thermistor element.

Another mode of the present invention is a temperature sensor which comprises any one of the above-described thermistor elements.

Since the above-described temperature sensor uses any one of the above-described thermistor elements, the temperature sensor is excellent in terms of reduction resistance and thermal responsiveness.

Still another mode of the present invention is a method of manufacturing a thermistor element including a thermistor main body made of an electrically conductive sintered oxide and having a rectangular parallelepiped shape, and a first covering layer which has reduction resistance, which covers a periphery of the thermistor main body, and which has an outer surface, at least a portion of which is an exposed outer surface exposed to the outside, wherein when the shortest distance in a straight line in the first covering layer extending from a starting point on the thermistor main body to the exposed outer surface is defined as an exposed layer thickness at the starting point, the first covering layer is formed such that an exposed layer thickness measured by using any vertex of the rectangular parallelepiped thermistor main body as a starting point is equal to or greater than the smallest one of exposed layer thicknesses measured by using, as starting points, points which are other than the vertex and located on three sides and three flat surfaces which form the vertex. The method comprises a press step of press forming a green first covering layer, which is to become the first covering layer through firing, into a shape for encapsulating the thermistor main body; and a firing step of firing the green first covering layer to thereby form the first covering layer.

The above-described thermistor element manufacturing method include the above-described press step and the above-described firing step. In the press step, the green first covering layer is formed by press forming. Therefore, unlike the case where the thermistor main body is dipped into paste so as to form a covering layer, there can be readily manufactured the thermistor element in which the exposed layer thickness measured by using each vertex as a starting point is equal to or greater than those measured by using, as starting points, points (excluding the vertex) on the three sides and three flat surfaces which form the vertex. Thus, it is possible to manufacture the thermistor element in which, through provision of the single first covering layer, invasion of reducing gases toward any portion of the thermistor main body (including the case where reducing gases invade toward the vertexes of the thermistor main body) can be properly restrained over the entire surface of the thermistor element.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Modes for Carrying out the Invention

Example 1

Figure 1:
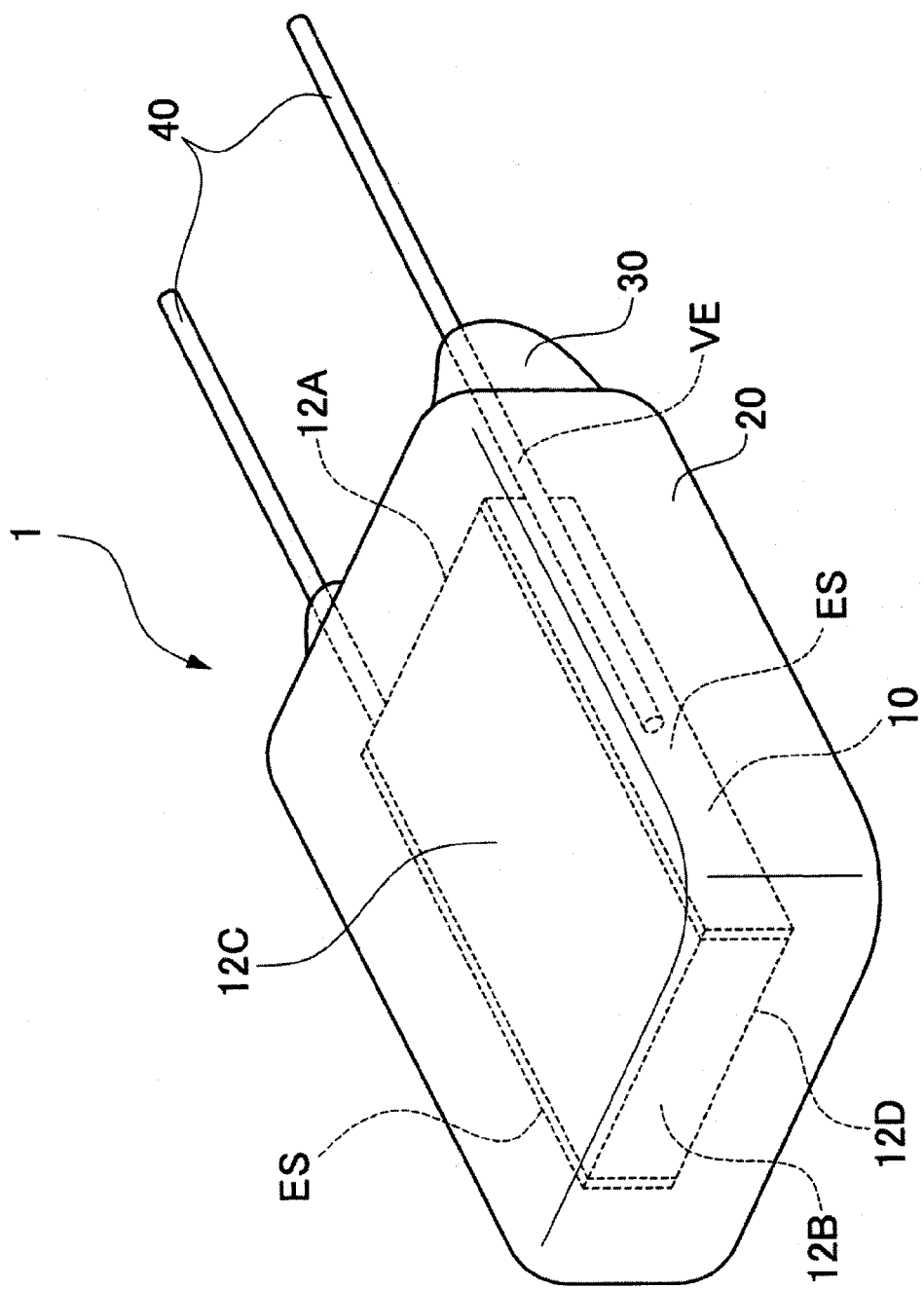
FIG. 1 is a perspective view of a thermistor element according to Embodiment 1.

Next, Example 1, which is one example of Embodiment 1 of the present invention, will be described.

First, a thermistor element 1 according to Example 1 will be described with reference to FIGS. 1 to 3. This thermistor element 1 includes a thermistor main body 10 which is formed of an electrically conductive sintered oxide and has a rectangular parallelepiped shape; and a first covering layer 20 which has reduction resistance and covers the entire periphery of the thermistor main body 10 (see FIG. 1). Also, the thermistor element 1 includes a pair of leads 40 which are connected to the thermistor main body 10, penetrate through the first covering layer 20, and project therefrom; and a second covering layer 30 which has reduction resistance (see FIG. 1).

Figure 4:
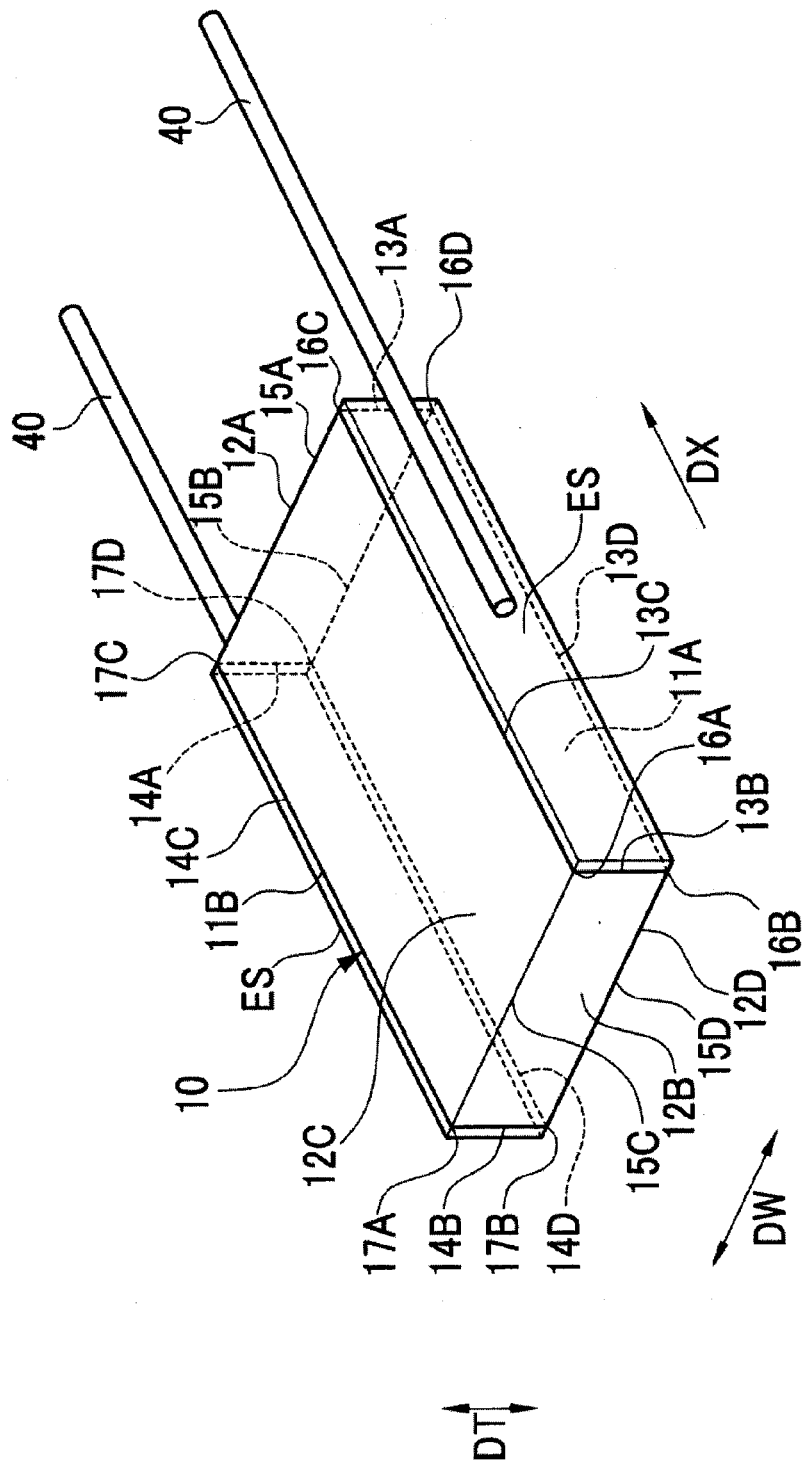
FIG. 4 is a view used for explaining a method for manufacturing the thermistor elements according to Embodiment 1 and a modified embodiment.

As shown in FIG. 4, the thermistor main body 10 has a rectangular parallelepiped shape as a result of dicing. The thermistor main body 10 has connection surfaces (a first connection surface 11A and a second connection surface 11B) which face in parallel with each other. Electrode layers ES made of platinum are formed on these connection surfaces 11A and 11B, and the pair of leads 40 are connected to the connection surfaces 11A and 11B via the electrode layers ES (see FIGS. 1, 2, and 4).

Figure 2:
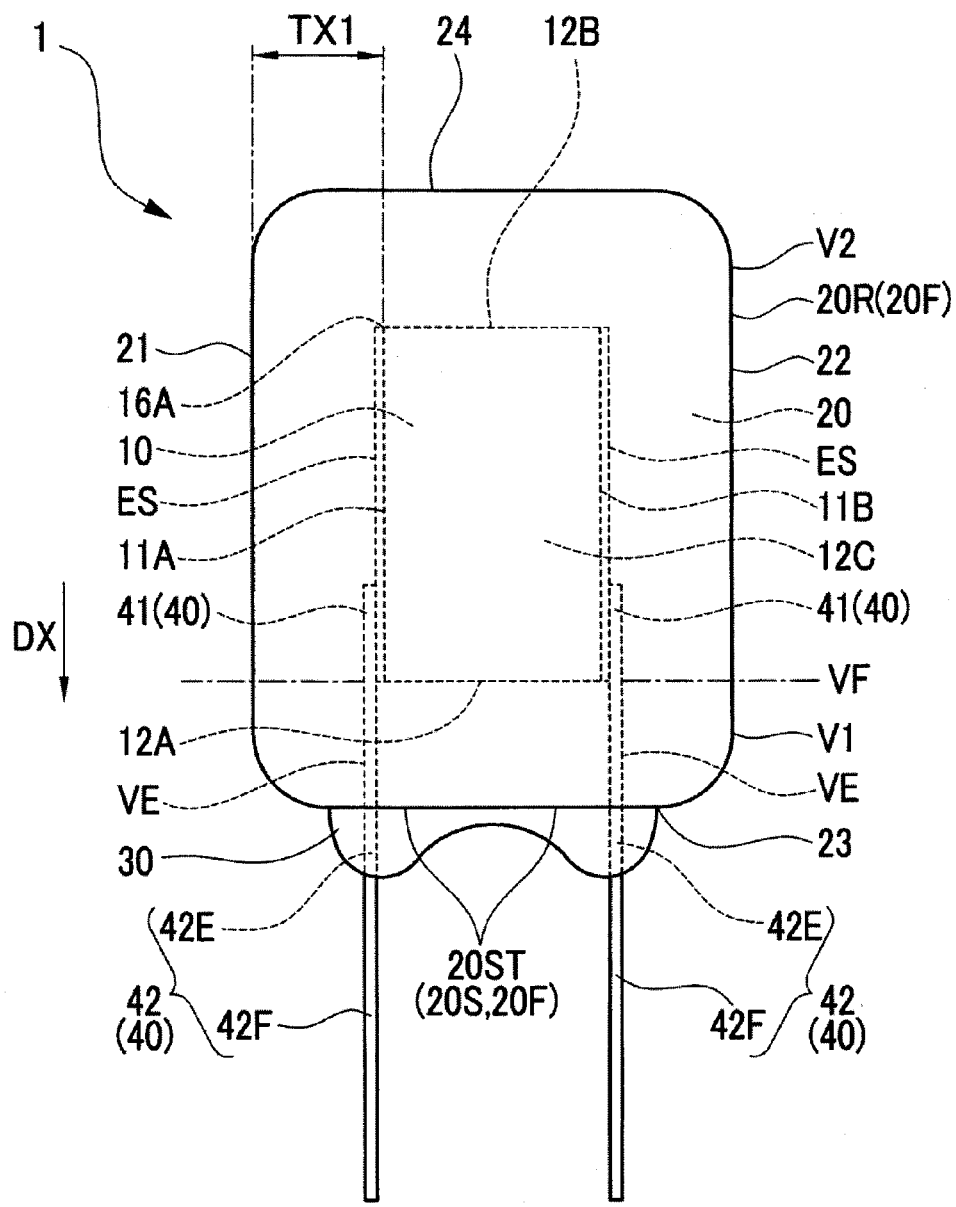
FIG. 2 is a top view of the thermistor element according to Embodiment 1.

The thermistor main body 10 has four side surfaces 12A-12D which connect the two connection surfaces 11A ad 11B together (see FIGS. 1, 2, and 4). Of these side surfaces, the first side surface 12A is located on one side of the thermistor main body 10 where the leads 40 extend or project outward from the first covering layer 20 in the extending direction DX. The second side surface 12B is located opposite (faces) the first side surface 12A. The third side surface 12C and the fourth side surface 12D are located opposite (face) each other (see FIGS. 1, 3, and 4).

As shown in FIG. 4, the thermistor main body 10 has four sides (first through fourth sides 13A-13D) which define the first connection surface 11A, and four sides (fifth through eighth sides 14A-14D) which define the second connection surface 11B. The thermistor main body 10 also has four sides (ninth through twelfth sides 15A-15D) each located between adjacent two of the four side surfaces (the first side surface 12A, the second side surface 12B, the third side surface 12C, and the fourth side surface 12D) (see FIG. 4).

The thermistor main body 10 has eight vertexes at each of which three sides intersect with one another (or three flat surfaces intersect with one another). Specifically, as shown in FIG. 4, the thermistor main body 10 has first through fourth vertexes 16A-16D which define the first connection surface 11A, and fifth through eighth vertexes 17A-17D which define the second connection surface 11B (see FIG. 4).

Each of the leads 40 is a circular columnar rod formed of a platinum-rhodium alloy which has a coefficient of linear thermal expansion of $98 \times 10^{-7}/°$ C. in a range of 50 to 900° C. Each of the leads 40 has an inside portion 41 located inside the first covering layer 20, and an extension portion 42 extending outward from the first covering layer 20 (see FIG. 2). A portion of the inside portion 41 is connected to the electrode layer ES of the first connection surface 11A (or the second connection surface 11B) of the thermistor main body 10. The extension portion 42 has an adjacently existing part 42E which is located adjacent to the inside portion 41 and the first covering layer 20; i.e., located adjacent to the first covering layer 20 and covered by the second covering layer 30, and an exposed part 42F which is not covered by the second covering layer 30 and is exposed to the outside.

The first covering layer 20 is formed of crystallized glass having a coefficient of linear thermal expansion of $99 \times 10^{-7}/°$ C. in the range of 50 to 900° C. The outer surface 20F of this first covering layer 20 includes an exposed outer surface 20R exposed to the outside, and a covered outer surface 20S covered by the second covering layer 30.

Notably, in the thermistor element 1 of the present Embodiment 1, the first covering layer 20 also has a rectangular parallelepiped shape; i.e., has flat surfaces which are approximately parallel to the flat surfaces (the connection surfaces 11A, 11B and the side surfaces 12A-12D) of the thermistor main body 10 (see FIG. 1). Specifically, the first covering layer 20 has a first flat surface 21, a second flat surface 22, a third flat surface 23, a fourth flat surface 24, a fifth flat surface 25, and a sixth flat surface 26, which are parallel to the first connection surface 11A, the second connection surface 11B, the first side surface 12A, the second side surface 12B, the third side surface 12C, and the fourth side surface 12D, respectively, of the thermistor main body 10 (see FIGS. 2 and 3).

In the thermistor element 1 of the present Embodiment 1, the shortest distance in a straight line extending from a starting point on the thermistor main body 10 to the exposed outer surface 20R is referred to as an exposed layer thickness at that starting point. In such a case, the exposed layer thickness measured by using each vertex 16A-16D, 17A-17D as a starting point is equal to or greater than the smallest one of the exposed layer thicknesses measured by using, starting points, points (excluding the vertex 16A-16D, 17A-17D) on the three sides and three flat surfaces which form the vertex. The smallest one of the exposed layer thicknesses will be referred to as the smallest exposed layer thickness.

Specifically, of the eight vertexes of the thermistor main body 10, the first vertex 16A will be considered. As described above, the first vertex 16A is a point where three sides; i.e., the second side 13B, the third side 13C, and the eleventh side 15C, intersect with one another. Also, the first vertex 16A is a point where three flat surfaces; i.e., the first connection surface 11A, the second side surface 12B, and the third side surface 12C, intersect with one another.

Notably, the first covering layer 20 of the present Embodiment 1 has a thickness TX1 (first layer thickness) when measured between the first connection surface 11A and the first flat surface 21 (see FIG. 2). The first covering layer 20 has a thickness TX2 (second layer thickness) when measured between the second side surface 12B and the fourth flat surface 24, and a thickness TX3 (third layer thickness) when measured between the third side surface 12C and the fifth flat surface 25 (see FIG. 3).

Since the first connection surface 11A and the first flat surface 21 are parallel to each other, the second side surface 12B and the fourth flat surface 24 are parallel to each other, and the third side surface 12C and the fifth flat surface 25 are parallel to each other, the exposed layer thickness measured at each starting point on the first connection surface 11A of the thermistor main body 10 is equal to the first layer thickness TX1. Also, the exposed layer thickness measured from the second side surface 12B is equal to the second layer thickness TX2, and the exposed layer thickness measured from the third side surface 12C is equal to the third layer thickness TX3. Notably, in the present Embodiment 1, the first layer thickness TX1, the second layer thickness TX2, and the third layer thickness TX3 have a relation of TX3<TX1<TX2.

Since the first covering layer 20 is formed of fired crystallized glass, unlike the thermistor main body 10, the first covering layer 20 has a rounded shape at each side where two adjacent flat surfaces of the flat surfaces 21-26 of the first covering layer 20 intersect with each other, and at each vertex thereof where three sides and three flat surfaces intersect with one another.

Figure 3:
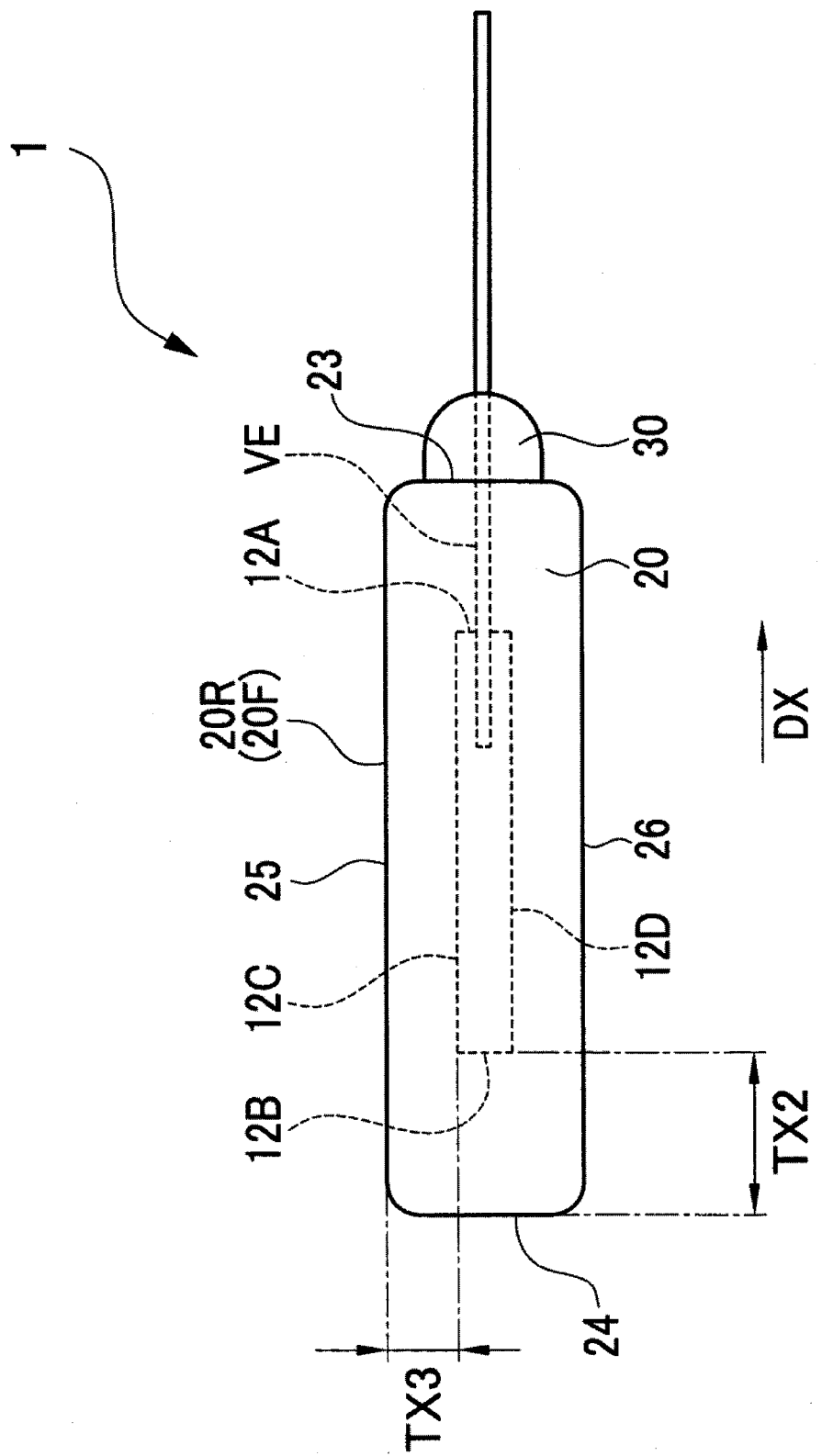
FIG. 3 is a side view of the thermistor element according to Embodiment 1.

However, as shown in FIGS. 1 to 3, the flat surfaces 21-26 of the first covering layer 20 are larger than the corresponding flat surfaces (the connection surfaces 11A, 11B and the side surfaces 12A-12D) of the thermistor main body 10. Therefore, the exposed layer thickness measured at each starting point on the second side 13B, which is one of the three sides forming the first vertex 16A, is equal to the first layer thickness TX1. Also, each of the exposed layer thickness measured from the third side 13C and the exposed layer thickness measured from the eleventh side 15C is equal to the third layer thickness TX3.

As described above, in the present Embodiment 1, the smallest exposed layer thickness is equal to the third layer thickness TX3, wherein the smallest exposed layer thickness is the smallest one of the exposed layer thickness measured by using, as starting points, points (excluding the first vertex 16A) on the three sides (the second side 13B, the third side 13C, and the eleventh side 15C) and the three flat surfaces (the first connection surface 11A, the second side surface 12B, and the third side surface 12C) which form the first vertex 16A of the thermistor main body 10.

Since the first vertex 16A is surrounded by three flat surfaces (the first flat surface 21, the fourth flat surface 24, and the fifth flat surface 25) of the first covering layer 20, the exposed layer thickness measured by using the first vertex 16A as a starting point is the third layer thickness TX3, which is the smallest among the first layer thickness TX1, the second layer thickness TX2, and the third layer thickness TX3. Accordingly, it is found that the exposed layer thickness of the first vertex 16A (the third layer thickness TX3) is equal to the smallest exposed layer thickness (the third layer thickness TX3) of the three sides and three flat surfaces which form the first vertex 16A.

In the present Embodiment 1, the first covering layer 20 has the first through sixth flat surfaces 21-26, which are parallel to and are greater in area than the first connection surface 11A, the second connection surface 11B, and the first through fourth side surfaces 12A-12D, respectively, of the thermistor main body 10. Therefore, like the first vertex 16A, each of the remaining vertexes 163-16D, 17A-17D has an exposed layer thickness which is equal to the smallest exposed layer thickness of the three sides and the three flat surfaces which form the corresponding vertex.

The second covering layer 30 is formed of amorphous glass having a coefficient of linear thermal expansion of 84×10$^{-7}$/° C. in the range of 50 to 900° C. This second covering layer 30 is formed on the third flat surface 23 of the first covering layer 20 having a rectangular parallelepiped shape. Also, the second covering layer 30 continuously covers a portion of each lead 40; specifically, the adjacently existing part 42E of the extension portion 42 of the lead 40 extending from the first covering layer 20, which part is located adjacent to the first covering layer 20, and a portion of the first covering layer 20; specifically, a surrounding outer surface portion 20ST of the outer surface 20F of the first covering layer 20, which portion is located around the adjacently existing part 42E. Thus, the second covering layer 30 airtightly closes the interfaces VE between the leads 40 and the first covering layer 20 (see FIGS. 1 to 3).

The outer surface 20F of the first covering layer 20 of the thermistor element 1 according to the present Embodiment 1 is divided into an extension-side outer surface V1 which is located outward of the first side surface 12A of the thermistor main body 10 with respect to the extending direction DX, and a main-body-side outer surface V2 which is located on the side toward the thermistor main body in relation to the first side surface 12A (on the side opposite the extending direction DX). Namely, the outer surface 20F of the first covering layer 20 is divided into the extension-side outer surface V1 and the main-body-side outer surface V2 at a virtual plane VF (reference) which includes the first side surface 12A (shown in FIG. 2). In this case, the second covering layer 30 is formed within the extension-side outer surface V1. Therefore, as compared with a thermistor element in which the second covering layer is also formed on the outer surface (the above-described main-body-side outer surface V2) which is located on the side toward the thermistor main body 10 in relation to the first side surface 12A, the thermistor element 1 has a higher thermal responsiveness.

Next, manufacture of the thermistor element 1 will be described.

First, the thermistor main body 10 having a rectangular parallelepiped shape was prepared. Notably, the thermistor main body 10 was prepared by forming a large ceramic plate having platinum layers which are formed on the entire front and back surfaces and which serve as the electrode layers ES, and dicing the ceramic plate into pieces having a rectangular parallelepiped shape.

Paste containing platinum was applied to the electrode layers ES provided on the thermistor main body 10 and the leads 40 formed of a platinum-rhodium alloy, and the leads 40 were joined to the electrode layers ES through heat treatment (see FIG. 4).

Next, a press step will be described. This press step is a step of press-forming a green first covering layer 20B which is to become the above-described first covering layer 20 through firing such that the green first covering layer 20B encapsulates the thermistor main body 10.

Figure 5:
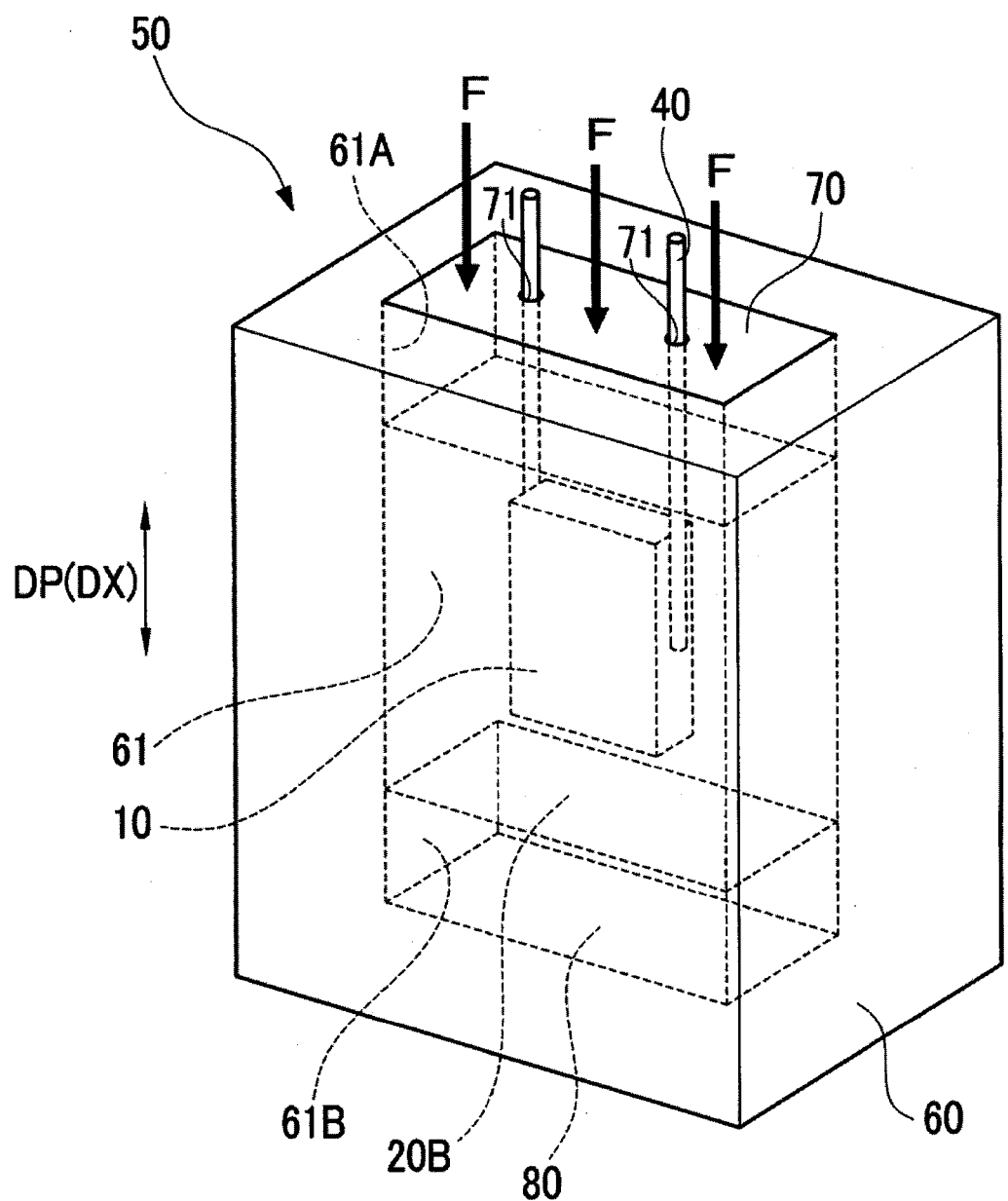
FIG. 5 is a view used for explaining a press step of the method for manufacturing the thermistor element according to Embodiment 1.

In this press step, there is used a mold apparatus 50 which is composed of a first die 60 which has a rectangular tubular shape and which has a through hole 61 extending in a first direction DP, and second and third dies 70, 80 each of which has the shape of a rectangular plate and which close the two openings (a first opening 61A and a second opening 61B) of the first die 60 (see FIG. 5). The first die 60 has inner dimensions greater than the outer dimensions of the first covering layer 20.

The second die 70 is disposed in the first opening 61A of the first die 60 on one side (upper side in FIG. 5) in the first direction DP so as to close the first opening 61A. The third die 80 is disposed in the second opening 61B of the first die 60 on the other side (lower side in FIG. 5) in the first direction DP so as to close the second opening 61B. The second die 70 has two through holes 71 which penetrate the second die 70 in the first direction DP. At the time of press forming, the leads 40 connected to the thermistor main body 10 are passed through the through holes 71. Notably, the diameter of the through holes 71 is made greater than the diameter of the leads 40 only slightly. Thus, in the press step, the powder which forms the green first covering layer 20B is prevented from leaking to the outside of the die apparatus 50 (the second die 70) through the clearances between the leads 40 and the wall surfaces of the through holes 71.

In the press step, the third die 80 is first disposed in the second opening 61B, which is one of the two openings 61A, 61B of the first die 60, whereby the second opening 61B is closed by the third die 80. Subsequently, the thermistor main body 10 having the leads 40 connected thereto is disposed at the center of the interior of the first die 60 through the first opening 61A. At that time, the thermistor main body 10 is disposed such that the extending direction DX of the leads 40 coincides with the first direction DP of the first die 60 and the leads 40 project to the outside of the first die 60 through the first opening 61A. A predetermined amount of glass powder formed of $SiO_2$—RO—$Al_2O_3$—$ZrO_2$ (R: alkaline earth metal) is then charged into the space between the first die 60 and the thermistor main body 10.

Subsequently, the first opening 61A of the first die 60 is closed by the second die 70, whereby the first die 60 is sealed. At that time, the two leads 40 extending from the interior of the first die 60 are passed through the through holes 71. An external force F is then applied to the second die 70 so as to press form the glass powder into a shape such that the glass powder encapsulates the thermistor main body 10. As a result, the green first covering layer 20B is formed inside the die apparatus 50 (the first die 60, the second die 70, and the third die 80) (see FIG. 5). Notably, in the present Embodiment 1, the glass powder is press formed by applying an external force F to the second die 70 only. However, the glass powder may be press formed by applying another external force F to the third die 80 as well.

Next, the above-described green first covering layer 20B was fired (at 1050° C. for one hour), whereby the first covering layer 20 was formed (firing step).

Subsequently, through use of a known dispenser (apparatus for dispensing a fixed amount of liquid), paste containing glass powder formed of $SiO_2$—RO—$Al_2O_2$ (R: alkaline earth metal) was applied to the third flat surface 23 of the first covering layer 20. The applied paste was dried and fired (at 950° C. for one hour), whereby the second covering layer 30 was formed.

Notably, in the present Embodiment 1, a relation of X1>X2 and a relation of X3>X2 are satisfied, where X1 represents the coefficient of thermal expansion (=99×10$^{-7}$/° C.) of the first covering layer 20, X2 represents the coefficient of thermal expansion (=84×10$^{-7}$/° C.) of the second covering layer 30, and X3 represents the coefficient of thermal expansion (=98×10$^{-7}$/° C.) of the leads 40. Therefore, after firing, a compressive stress acts on the second covering layer 30, and cracking of the second covering layer 30 is restrained.

In this manner, the thermistor element 1 of the present Embodiment 1 is completed (see FIGS. 1 to 3).

The resistance of the obtained thermistor element 1 against reduction was evaluated as follows.

Namely, the initial resistance of the thermistor element 1 was measured in an atmospheric environment of 900° C. After that, the thermistor element 1 was held in a reducing gas (Ar:$H_2$=95:5) of 900° C. for one hour, and the resistance was then measured. The resistance of the thermistor element 1 measured after being held in the reducing gas was subtracted from the initial resistance, and the resultant value wad divided by the initial resistance, whereby a resistance change rate (%) was calculated. A sample of the thermistor element 1 whose resistance change rate was less than 1% was determined to have passed the test, and a sample of the thermistor element 1 whose resistance change rate was equal to or greater than 1% was determined to have failed the test.

The number N of the samples was set to 10 (N=10). Each sample was determined whether to have passed the test, and the passing rate was calculated.

Table 1 shows the evaluation result (passing rate). Table 1 also shows the difference (X1–X2) between the coefficient of thermal expansion X1 of the first covering layer 20 and the coefficient of thermal expansion X2 of the second covering layer 30, and the difference (X3–X2) between the coefficient of thermal expansion X3 of the leads 40 and the coefficient of thermal expansion X2 of the second covering layer 30.

TABLE 1

| | First covering layer | | | | | Second covering layer | | |
|---|---|---|---|---|---|---|---|---|
| | Shape | Material | Glass composition | Coefficient of thermal expansion X1 (10$^{-7}$/° C.) | Provided/ Not provided | Material | Glass composition | Coefficient of thermal expansion X2 (10$^{-7}$/° C.) |
| Example 1 (Thermistor element 1) | R.P. | Crystallized glass | $SiO_2$—RO—$Al_2O_3$—$ZrO_2$ | 99 | Provided | Amorphous glass | $SiO_2$—RO—$Al_2O_3$ | 84 |
| Example 2 | | | | | Not provided | — | — | — |
| Example 3 | | | | | Provided | Amorphous glass + $Y_2O_3$ | $SiO_2$—RO—$Al_2O_3$ | 88 |
| Example 4 | | | | | Provided | Crystallized glass + $Al_2O_3$ | $SiO_2$—RO—$Al_2O_3$—$ZrO_2$ | 93 |
| Example 5 | | Crystallized glass + $Al_2O_3$ | | 93 | Provided | Amorphous glass | $SiO_2$—RO—$Al_2O_3$ | 84 |
| Example 6 | | | | | Provided | Amorphous glass + $Y_2O_3$ | | 88 |
| Example 7 | | Crystallized glass | $SiO_2$—RO—ZnO | 88 | Provided | Crystallized glass + $Al_2O_3$ | $SiO_2$—RO—$Al_2O_3$—$ZrO_2$ | 93 |
| Example 8 | | Crystallized glass | $SiO_2$—RO—$Al_2O_3$—$ZrO_2$ | 99 | Provided | Amorphous glass | $SiO_2$—RO—$B_2O_3$ | 79 |
| Comparative Example 1 | Flattened sphere | Crystallized glass | $SiO_2$—RO—$Al_2O_3$—$ZrO_2$ | 99 | Not provided | — | — | — |
| Comparative Example 2 | R.P. | Crystallized glass | $SiO_2$—RO—$Al_2O_3$—$ZrO_2$ | 99 | Provided | Amorphous glass | $SiO_2$—RO—$Al_2O_3$ | 84 |

| | Leads Coefficient of thermal expansion X3 (10$^{-7}$/° C.) | Results of evaluation of reduction resistance (passing rate) | X1 – X2 (10$^{-7}$/° C.) | X3 – X2 (10$^{-7}$/° C.) | Covering of first covering layer by second covering layer | Thermal responsiveness |
|---|---|---|---|---|---|---|
| Example 1 (Thermistor element 1) | 98 | 9/10 | 15 | 14 | Only V1 is covered | ○ |
| Example 2 | | 6/10 | — | — | | ○ |

TABLE 1-continued

| | | | | | | |
|---|---|---|---|---|---|---|
| Example 3 | | 10/10 | 11 | 10 | Only V1 is covered | ○ |
| Example 4 | | 9/10 | 6 | 5 | Only V1 is covered | ○ |
| Example 5 | | 10/10 | 9 | 14 | Only V1 is covered | ○ |
| Example 6 | | 10/10 | 57 | 10 | Only V1 is covered | ○ |
| Example 7 | | 7/10 | (−5) | 5 | Only V1 is covered | ○ |
| Example 8 | | 8/10 | 20 | 19 | Only V1 is covered | ○ |
| Comparative Example 1 | 98 | 1/10 | — | — | — | — |
| Comparative Example 2 | 98 | — | 15 | 14 | Entire outer surface (V1, V2) is covered | X |

(Note)
R.P.: Rectangular parallelepiped
R: alkaline earth metal
V1: extension-side outer surface
V2: main-body-side outer surface Examples 2 to 8 and Comparative Example 1

Also, thermistor elements of Examples 2 to 8 and a thermistor element of Comparative Example 1, which differ from the thermistor element 1 of the above-described Example 1 were prepared.

Specifically, the thermistor element of Example 2 differs from the thermistor element 1 of Example 1 in that the thermistor element of Example 2 does not have the second covering layer (see Table 1).

The thermistor element of Example 3 differs from the thermistor element 1 of Example 1 in that a mixture of amorphous glass and yttrium oxide is used as the material of the second covering layer (see Table 1).

The thermistor element of Example 4 differs from the thermistor element 1 of Example 1 in that a mixture of crystallized glass and aluminum oxide is used as the material of the second covering layer, and the crystallized glass has a composition of $SiO_2$—RO—$Al_2O_3$—$ZrO_2$ (R: alkaline earth metal) (see Table 1).

The thermistor element of Example 5 differs from the thermistor element 1 of Example 1 in that a mixture of crystallized glass and aluminum oxide is used as the material of the first covering layer (see Table 1).

The thermistor element of Example 6 differs from the thermistor element 1 of Example 1 in that a mixture of crystallized glass and aluminum oxide is used as the material of the first covering layer, and a mixture of amorphous glass and yttrium oxide is used as the material of the second covering layer (see Table 1).

The thermistor element of Example 7 differs from the thermistor element 1 of Example 1 in that the crystallized glass of the first covering layer has a composition of $SiO_2$—RO—ZnO (R: alkaline earth metal), a mixture of crystallized glass and aluminum oxide is used as the material of the second covering layer, and the crystallized glass of the second covering layer has a composition of $SiO_2$—RO—$Al_2O_2$—$ZrO_2$ (R: alkaline earth metal) (see Table 1).

The thermistor element of Example 8 differs from the thermistor element 1 of Example 1 in that the amorphous glass of the second covering layer has a composition of $SiO_2$—RO—$B_2O_3$ (R: alkaline earth metal) (see Table 1).

Meanwhile, the thermistor element of Comparative Example 1 differs from the thermistor elements of Examples 1 to 8 (in which the first covering layer 20 has a rectangular parallelepiped shape) in that the first covering layer formed of crystallized glass has a flattened spherical shape (spheroidal shape) (see Table 1). The thermistor element of Comparative Example 1 was manufactured as follows. Leads were connected to a thermistor main body identical to that of Example 1, and the thermistor main body was dipped into paste containing glass powder such that the paste forms a flattened spherical shape, followed by firing, whereby the first covering layer was formed.

The reduction resistances of the thermistor elements of Examples 2 to 8 and Comparative Example 1 were evaluated by a test similar to that performed for the thermistor element 1 of Example 1. Table 1 also shows the evaluation results (passing rates) of these thermistor elements.

It is found from Table 1 that, whereas the passing rate of the thermistor element of Comparative Example 1 is 1/10, the passing rate of each of the thermistor elements of Examples 1 to 8 is equal to or higher than 6/10 and is higher than that of the thermistor element of Comparative Example 1. In the case of the thermistor element of Comparative Example whose first covering layer has a flattened spherical shape (spheroidal shape), the thickness of the first covering layer at each of the vertexes of the rectangular parallelepiped thermistor main body is smaller than those in regions around the vertexes. Conceivably, the reducing gas invaded into the main body through these thinner portions of the first covering layer, which lowered the passing rate of the thermistor element of Comparative Example 1.

In contrast, in the thermistor element (the thermistor element 1) of each of Examples 1 to 8, the exposed layer thickness of the first covering layer 20 measured at each of the vertexes (starting points) of the thermistor main body 10 is equal to or greater than the smallest exposed layer thickness. Therefore, conceivably, through provision of the single first covering layer 20, invasion of the reducing gas toward any portion of the thermistor main body 10 (including the case where the reducing gas invades toward the vertexes of the thermistor main body 10) was able to be properly restrained over the entire surface of the thermistor element 1.

Of the thermistor elements of Examples 1 to 8, the thermistor element of Example 2 not having the second covering layer had a passing rate lower than those of the remaining thermistor elements. Conceivably, the thermistor element of Example 2 had a lower passing rate because of the following reason. Since the reducing gas is more likely to invade through the interfaces between the first covering layer and the leads extending through the first covering layer and projecting outward therefrom, the thermistor element of Example 2 not having the second covering layer which covers the leads and the first covering layer failed to prevent invasion of the reducing gas toward the thermistor main body.

In contrast, in the thermistor element (the thermistor element 1) of each of Examples 1 and 3 to 8, the second covering layer 30 covers the adjacently existing parts 42E of the leads 40 and the surrounding outer surface portion 20ST of the first covering layer 20, to thereby airtightly closes the interfaces VE between the leads 40 and the first covering layer 20. Therefore, conceivably, this second covering layer 30 properly prevented the reducing gas from invading through the interfaces VE between the first covering layer 20 and the leads 40.

Also, it is found from Table 1 that the thermistor element of Example 7 in which the coefficient of thermal expansion X1 of the first covering layer 20 and the coefficient of thermal expansion X2 of the second covering layer 30 satisfy a relation of X1<X2 has a passing rate (7/10) lower than the passing rates of the thermistor elements of Examples 1, 3-6, and 8 in which the coefficient of thermal expansion X1 of the first covering layer 20 and the coefficient of thermal expansion X2 of the second covering layer 30 satisfy a relation of X1>X2. The thermistor element of Example 7 has a lower passing rate because of the following reason. In the case where the coefficient of thermal expansion X2 of the second covering layer 30 is lower than the coefficient of thermal expansion X1 of the first covering layer 20, after firing, a sufficiently large compressive stress does not act on the second covering layer 30, and cracking easily occurs in the second covering layer 30.

In contrast, in the thermistor element (thermistor element 1) of each of Examples 1, 3 to 6, and 8, the coefficient of thermal expansion X1 of the first covering layer 20, the coefficient of thermal expansion X2 of the second covering layer 30, and the coefficient of thermal expansion X3 of the leads 40 satisfy the relation of X1>X2 and the relation of X3>X2. Accordingly, after firing, a sufficiently large compress stress acts on the second covering layer 30, and cracking of the second covering layer 30 can be restrained. Therefore, the thermistor element 1 can reliably prevent the reducing gas from invading through the interfaces VE between the first covering layer 20 and the leads 40.

Of the thermistor elements of Examples 1, 3 to 6, and 8, the thermistor element of Example 8 in which each of the difference (X1−X2) and the difference (X3−X2) is greater than $15 \times 10^{-7}/° C$. has a passing rate (8/10) lower than those of the thermistor elements of Examples 1 and 3 to 6 in which the difference (X1−X2) is equal to or less than $15 \times 10^{-7}/° C$. and the difference (X3−X2) is equal to or less than $15 \times 10^{-7}/° C$. Conceivably, the thermistor element of Example 8 has a lower passing rate because of the following reason. In each of the thermistor elements of Examples 1 and 3 to 6 in which the coefficients of thermal expansion X1, X2, X3 of the first covering layer 20, the second covering layer 30, and the leads 40 differ from one another only slightly, even when the environment temperature of the thermistor element changes, formation of a clearance or separation (cracking) is less likely to occur between the first covering layer 20 and the second covering layer 30 or between the leads 40 and the second covering layer 30. Therefore, in the thermistor elements 1 of Examples 1 and 3 to 6, the interfaces VE between the leads 40 and the first covering layer 20 are reliably covered and sealed by the second covering layer 30.

In the thermistor element (thermistor element 1) of each of Examples 1 and 3 to 8, since the second covering layer 30 is formed of glass or a mixture of glass and metal oxide particles, this second covering layer 30 can reliably prevent the reducing gas from invading through the interfaces VE between the first covering layer 20 and the leads 40.

In the thermistor element (thermistor element 1) of each of Examples 1, 3, 5, 6, and 8, the second covering layer 30 is formed of amorphous glass. As compared with crystallized glass, amorphous glass more easily softens and flows at the time of firing and fills the interfaces VE between the first covering layer 20 and the leads 40. Therefore, the second covering layer 30 can reliably prevent the reducing gas from invading through the interfaces VE between the first covering layer 20 and the leads 40.

In the thermistor element (thermistor element 1) of each of Examples 1 to 8, the first covering layer 20 is formed of glass or a mixture of glass and metal oxide particles. Therefore, through provision of the single first covering layer 20, invasion of the reducing gas toward the thermistor main body 10 (including the vertexes thereof) can be reliably restrained over the entire surface of the thermistor element 1.

Also, in the thermistor element (thermistor element 1) of each of Examples 1 to 8, the glass which forms the first covering layer 20 is crystallized glass. Since the heat resistance of crystallized glass is generally higher than that of amorphous glass, by using crystallized glass as the glass which forms the first covering layer 20, it is possible to secure the high temperature reliability of the thermistor main body 10; i.e., the reliability of the thermistor main body 10 against high temperature to which the thermistor main body 10 is exposed through the first covering layer 20.

Also, in the thermistor element (thermistor element 1) of each of Examples 1 to 8, since the first covering layer 20 has a generally rectangular parallelepiped outer shape; i.e., has flat surfaces which are parallel to the corresponding flat surfaces of the thermistor main body 10, the exposed layer thickness measured by using each vertex as a starting point can be reliably made equal to or greater than those measured by using points on the corresponding sides and flat surfaces as starting points. Therefore, through provision of the single first covering layer 20, invasion of the reducing gas toward the thermistor main body 10 can be reliably restrained over the entire surface of the thermistor element 1.

Meanwhile, the method of manufacturing the thermistor element (thermistor element 1) of Embodiment 1 (Examples 1 to 8) includes the above-described press step and the above-described firing step. In the press step, the above-described green first covering layer 20B is formed by press forming. Therefore, unlike the case where the thermistor main body 10 is dipped into paste so as to form a covering layer, there can be readily manufactured the thermistor element 1 in which the exposed layer thickness measured by using each vertex of the thermistor main body 10 as a starting point is equal to or greater than those measured by using, as starting points, points (excluding the vertex) on the sides and flat surfaces which form the vertex. Thus, it is possible to manufacture the thermistor element 1 in which, through provision of the single first covering layer 20, invasion of the reducing gas toward any portion of the thermistor main body 10 (including the case where the reducing gas invades toward the vertexes of the thermistor main body 10) can be properly restrained over the entire surface of the thermistor element 1.

Modified Embodiment

Next, a thermistor element 101 according to a modified embodiment of the present invention will be described with reference to the drawings.

The present modified embodiment differs from the above-described Embodiment 1 (Examples 1 to 8) in that the first covering layer has a circular columnar outer shape.

Therefore, only the point different from Embodiment 1 will be mainly described, and description of portions similar to those of Embodiment 1 will be omitted or simplified. Notably, the portions which are the same as those of Embodiment 1 provide the same actions and effects. Also, in the following description, like members and portions are denoted by like reference numerals.

Figure 6:
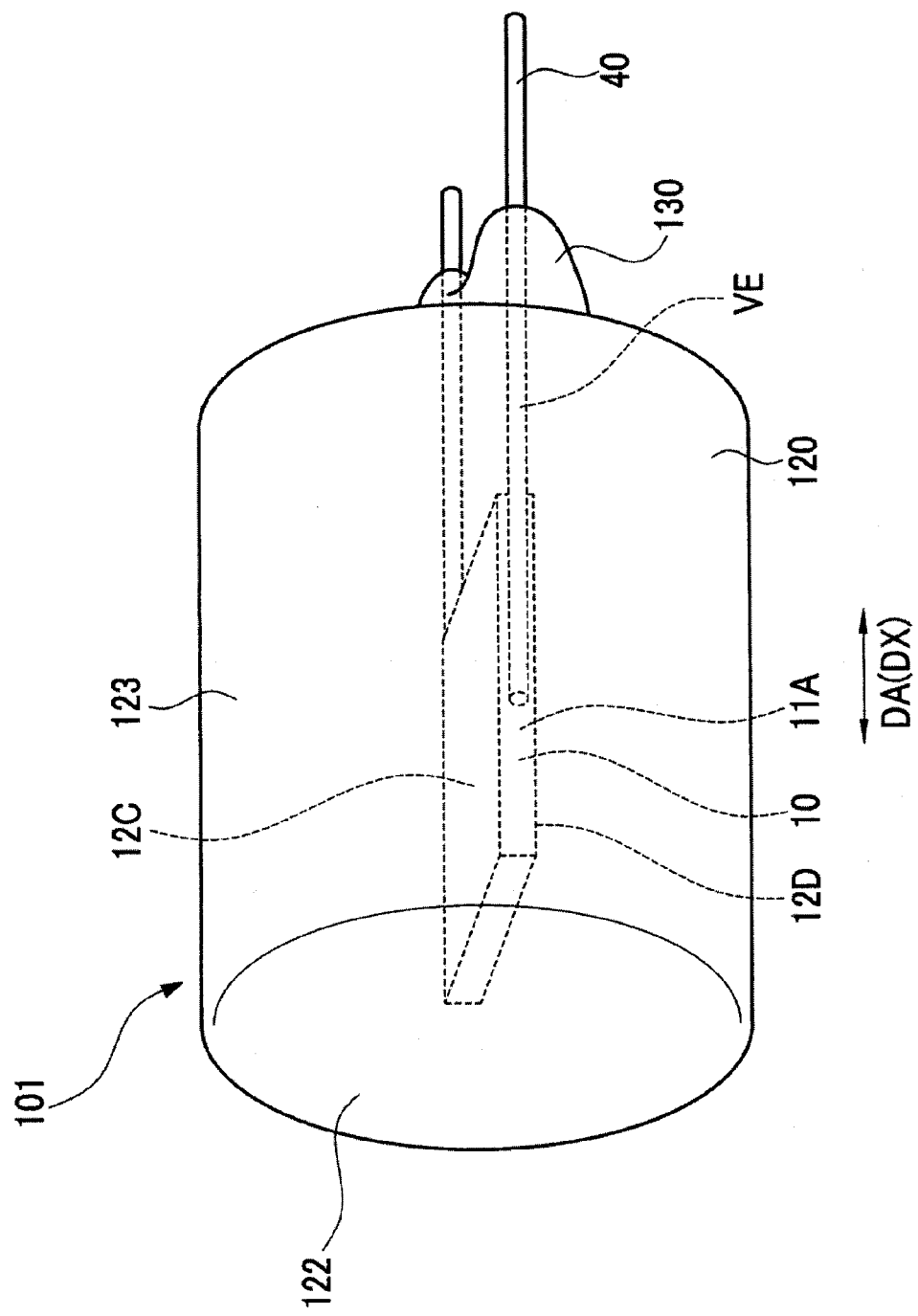
FIG. 6 is a perspective view of the thermistor element according to the modified embodiment.

The thermistor element 101 of the present modified embodiment has a first covering layer 120 and a second covering layer 130, which have reduction resistance, in addition to a rectangular parallelepiped thermistor main body 10 and a pair of leads 40 similar to those employed in the thermistor element of Embodiment 1 (see FIG. 6).

The first covering layer 120 is formed of crystallized glass similar to that employed in Embodiment 1.

Notably, the first covering layer 120 of the present modified embodiment differs from the first covering layer 20 of Embodiment 1 in that the first covering layer 120 has a circular columnar outer shape (see FIG. 6). Specifically, the first covering layer 120 has a first flat surface 121 and a second flat surface 122 which are parallel to the first side surface 12A or the second side surface 12B of the thermistor main body 10 (see FIG. 7).

Figure 7:
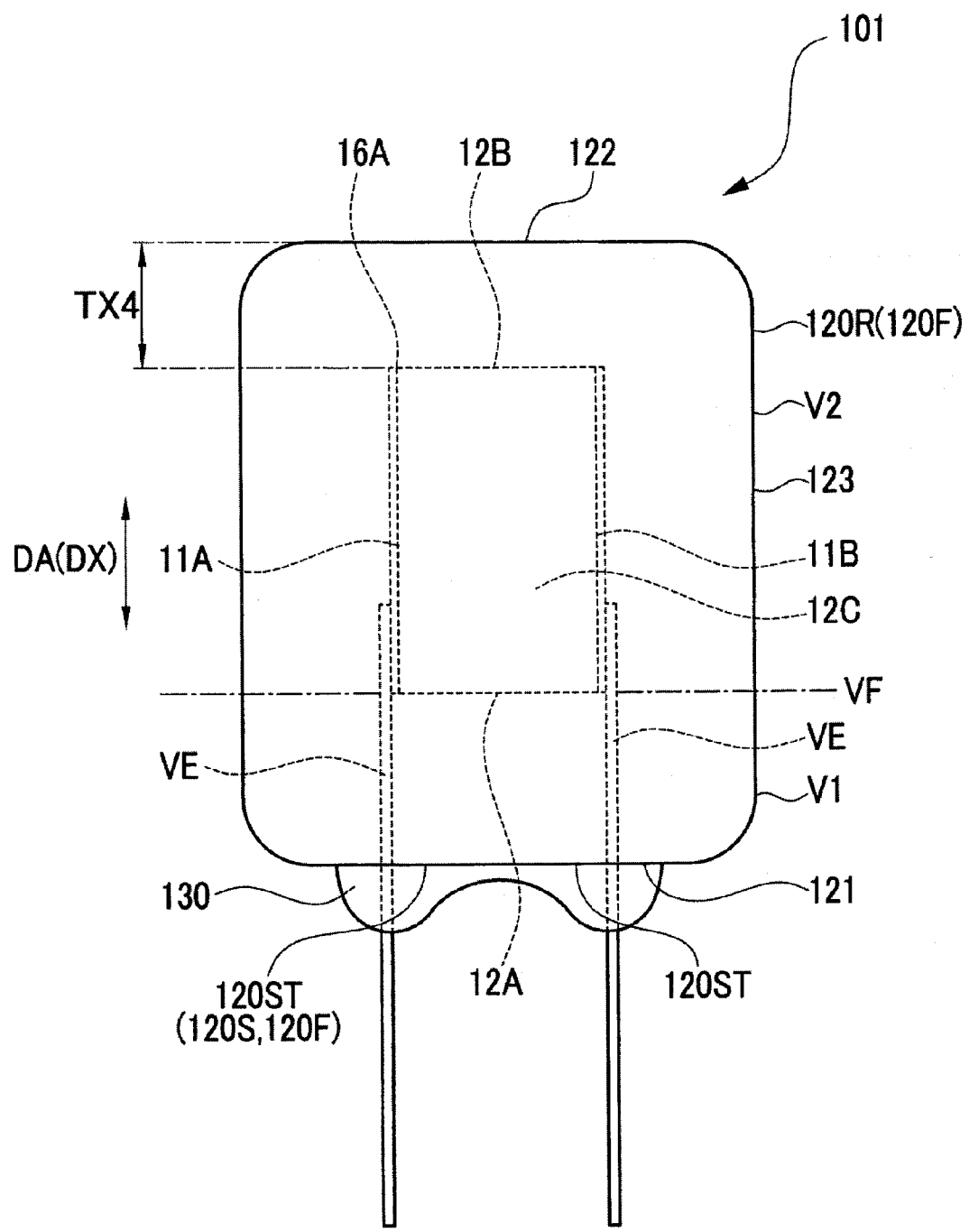
FIG. 7 is a top view of the thermistor element according to the modified embodiment.

The first covering layer 120 also has a cylindrical side surface 123 which is located outward of the first connection surface 11A, the second connection surface 11B, the third side surface 12C, and the fourth side surface 12D of the thermistor main body 10 (see FIGS. 6 and 7). Notably, in the present modified embodiment, the direction DA of the center axis AX of the cylindrical side surface 123 is parallel to the extending direction D2 of the thermistor main body 10.

The first covering layer 120 has an exposed outer surface 120R which is a portion of an outer surface 120F and is exposed to the outside, and a covered outer surface 120S which is a portion of the outer surface 120F and is covered by the second covering layer 130. Notably, in the present modified embodiment, the second flat surface 122 and the side surface 123 correspond to the exposed outer surface 120R, and a portion of the first flat surface 121 corresponds to the covered outer surface 120S (see FIG. 7).

In the thermistor element 101 of the present modified embodiment, the exposed layer thickness measured by using any vertex 16A-16D, 17A-17D of the thermistor main body 10 as a starting point is equal to or greater than the smallest exposed layer thickness which is the smallest one of the exposed layer thicknesses measured by using, as starting points, points (excluding the vertex 16A-16D, 17A-17D) on the three sides and three flat surfaces which form the vertex.

Specifically, the first vertex 16A of the thermistor main body 10 will be considered. As described above, the first vertex 16A is a point where three sides; i.e., the second side 13B, the third side 13C, and the eleventh side 15C, intersect with one another. Also, the first vertex 16A is a point where three flat surfaces; i.e., the first connection surface 11A, the second side surface 12B, and the third side surface 12C, intersect with one another (FIG. 4).

Of the three flat surfaces which intersect one another at the first vertex 16A, the second side surface 12B is parallel to the second flat surface 122 of the first covering layer 120 as described above. Therefore, when the thickness (fourth layer thickness) of the first covering layer 120 between the second side surface 12B and the second flat surface 122 is represented by TX4, the exposed layer thickness becomes equal to the fourth layer thickness TX4 at any starting point on the second side surface 12B of the thermistor main body 10.

Figure 8:
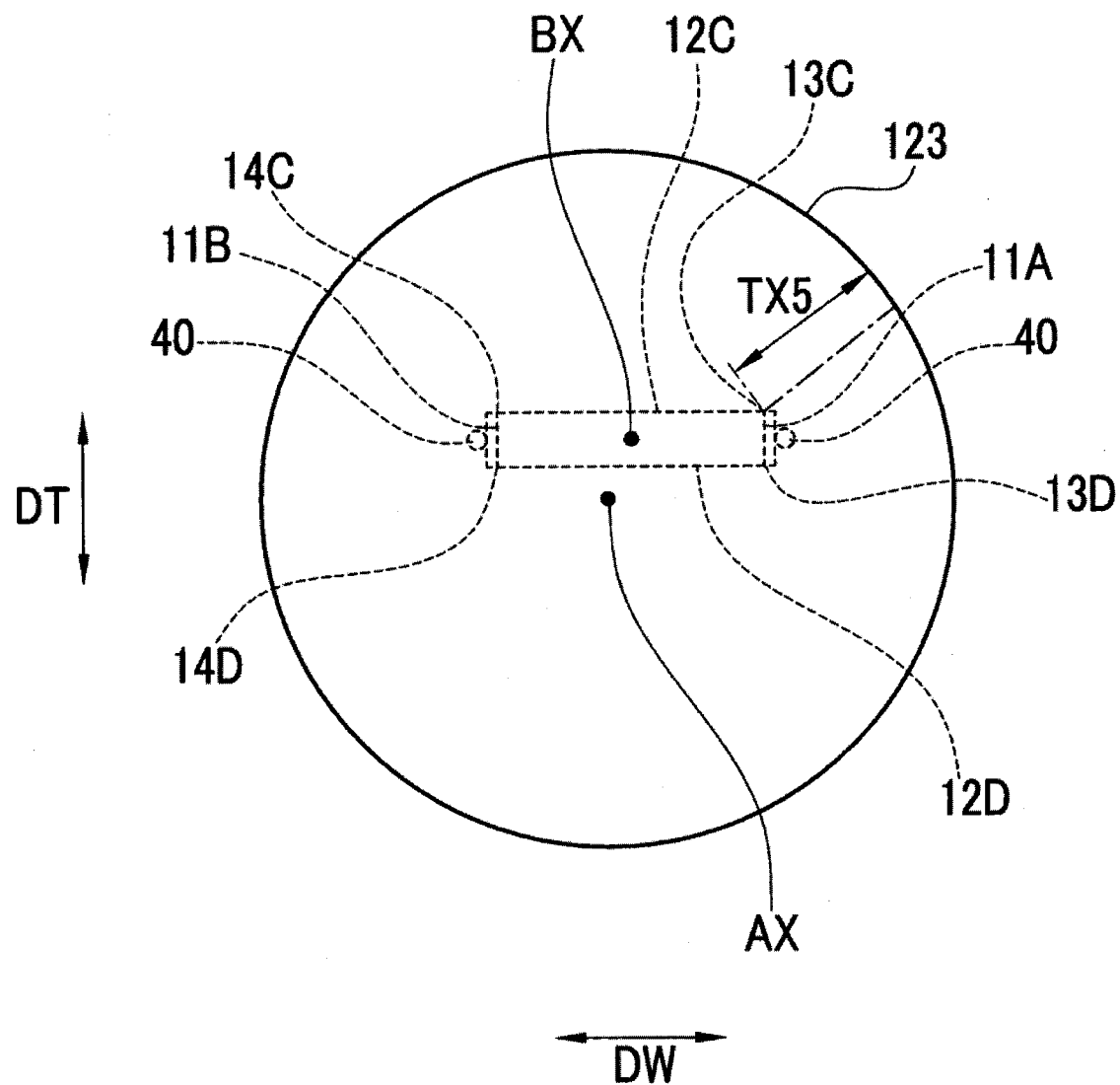
FIG. 8 is a side view of the thermistor element according to the modified embodiment.

Meanwhile, in FIG. 8 which is a side view of the thermistor element 101 as viewed from the outside in the extending direction DX, the first connection surface 11A extends in the thickness direction DT (the vertical direction in FIG. 8) and in the extending direction DX (the front-to-back direction in FIG. 8).

Notably, the thermistor element 101 of the present modified embodiment is manufactured by the same method as that used for manufacturing the thermistor element 1 of Embodiment 1. Specifically, after the thermistor main body 10 is disposed in a die apparatus (first die), and glass powder is charged into the space between the first die and the thermistor main body 10 and is pressed formed. Therefore, in the case of the thermistor element 101, the thermistor main body 10 may be disposed at a position slightly deviated from the center of a circular transverse cross section of the first covering layer 120.

In view of this, FIG. 8 shows, as the thermistor element 101 of the present modified embodiment, a thermistor element in which the center line BX of the thermistor main body 10 (namely, a line which is located at the center in the thicknesswise direction DT and the center in the widthwise direction DW and which extends in the extending direction DX) is deviated from the center axis AX of the cylindrical first covering layer 120 toward the upper side (in FIG. 8) in the thicknesswise direction DT and toward the right side (in FIG. 8) in the widthwise direction DW (see FIG. 8).

In this case, a portion of the first connection surface 11A which is close to the side surface 123 is the third side 13C, which defines the first connection surface 11A. When the thickness (fifth thickness) of the first covering layer 120 between the third side 13C and the side surface 123 is represented by TX5, the smallest one of the exposed layer thicknesses measured by using points on the first connection surface 11A of the thermistor main body 10 as starting points is equal to the fifth layer thickness TX5.

Also, as shown in FIG. 8, the third side surface 12C extends in the widthwise direction DW (the left-to-right direction in FIG. 8) and in the extending direction DX (the front-to-back direction in FIG. 8). Notably, since the center line BX of the thermistor main body 10 is deviated from the center axis AX of the cylindrical first covering layer 120, a portion of the third side surface 12C which is close to the side surface 123 is the third side 13C which is shared by the above-described first connection surface 11A. Accordingly, the smallest one of the exposed layer thicknesses measured by using points on the third side surface 12C of the thermistor main body 10 as starting points is equal to the fifth layer thickness TX5.

However, since the first covering layer 120 is formed of fired crystallized glass as in the case of Embodiment 1, the first covering layer 120 has a rounded shape at the sides thereof where the flat surfaces 121 and 122 intersect with the side surface 123.

However, as shown in FIGS. 6 through 8, the second flat surface 122 of the first covering layer 120 is larger than the second side surface 12B of the thermistor main body 10 which corresponds thereto. Moreover, as shown in FIG. 7, the side surface 123 of the first covering layer 120 is greater than the first connection surface 11A and the third side surface 12C of the thermistor main body 10 as measured in the axial direction DA (the extending direction DX).

Therefore, the exposed layer thicknesses measured at the second side 13B and the eleventh side 15C, which are two of the three sides which form the first vertex 16A, are equal to the fourth layer thickness TX4, and the exposed layer thickness at the third side 13C is equal to the fifth layer thickness TX5.

Notably, in the thermistor element 101 of the present modified embodiment, the layer thicknesses TX4 and TX5 satisfy a relation of TX4<TX5. Accordingly, in the thermistor element 101 of the present modified embodiment, the smallest exposed layer thickness is equal to the fourth layer thickness TX4, wherein the smallest exposed layer thickness is the smallest one of the exposed layer thickness measured by using, as starting points, points (excluding the first vertex 16A) on the three sides (the second side 13B, the third side 13C, and the eleventh side 15C) and the three flat surfaces (the first connection surface 11A, the second side surface 12B, and the third side surface 12C) which form the first vertex 16A of the thermistor main body 10.

Meanwhile, since the first vertex 16A is surrounded by the second flat surface 122 and the side surface 123 of the first covering layer 120, the exposed layer thickness measured by using the first vertex 16A as a starting point is the fourth layer thickness TX4. Accordingly, it is found that, in the present embodiment, the exposed layer thickness of the first vertex 16A (the fourth layer thickness TX4) is equal to the smallest exposed layer thickness (the fourth layer thickness TX4) of the three sides and the three flat surfaces which form the first vertex 16A.

In the thermistor element 101 of the present modified Embodiment, the first covering layer 120 has the first and second flat surfaces 121 and 122, which are parallel to and are greater in area than the first and second side surfaces 12A and 12B, respectively, of the thermistor main body 10. Also, the first covering layer 120 has the side surface 123 whose axial direction DA is parallel to the extending direction DX of the thermistor main body 10 and is larger than the first and second connection surfaces 11A, 11B and the third and fourth side surfaces 12C, 12D of the thermistor main body 10 in the axial direction DA (in the extending direction DX). Therefore, like the first vertex 16A, each of the remaining vertexes 16B-16D and 17A-17D has an exposed layer thickness equal to the smallest exposed layer thickness of the three sides and three flat surfaces which form the corresponding vertex.

The second covering layer 130 is formed of amorphous glass which is the same as the amorphous glass employed in Embodiment 1. This second covering layer 130 is formed on the above-described first flat surface 121 of the first covering layer 120. Also, the second covering layer 130 continuously covers a part (adjacently existing part 42E) of the extension portion 42 of the lead 40 extending from the first covering layer 120, which part is located adjacent to the first covering layer 120, and a portion (surrounding outer surface portion 120ST) of the outer surface 120F of the first covering layer 120, which portion surrounds the adjacently existing part 42E.

Also, the second covering layer 130 is formed within an extension-side outer surface V1 of the outer surface 120F of the first covering layer 120 which is located on the outer side of the first side surface 12A with respect to the extending direction DX (see FIG. 7). Therefore, like the thermistor element 1 of Embodiment 1, the thermistor element 101 has a higher thermal responsiveness, as compared with a thermistor element in which the second covering layer is also formed on the main-body-side outer surface V2.

In the thermistor element 101 of the present modified embodiment, the first covering layer 120 has a circular columnar outer shape; i.e., has the first flat surface 121 and the second flat surface 122, which are a pair of flat surfaces parallel to a pair of mutually facing flat surfaces (the first and second side surfaces 12A, 12B) of the thermistor main body 10. Therefore, the exposed layer thickness measured by using each vertex as a starting point can be reliably made greater than the exposed layer thicknesses measured by using points on the sides and the flat surface as starting points. Therefore, through provision of the single first covering layer 120, invasion of the reducing gas into the thermistor main body 10 can be reliably restrained over the entire surface of the thermistor element 101.

Embodiment 2

Next, a temperature sensor 200 according to Embodiment 2 will be described with reference to the drawings.

Figure 9:
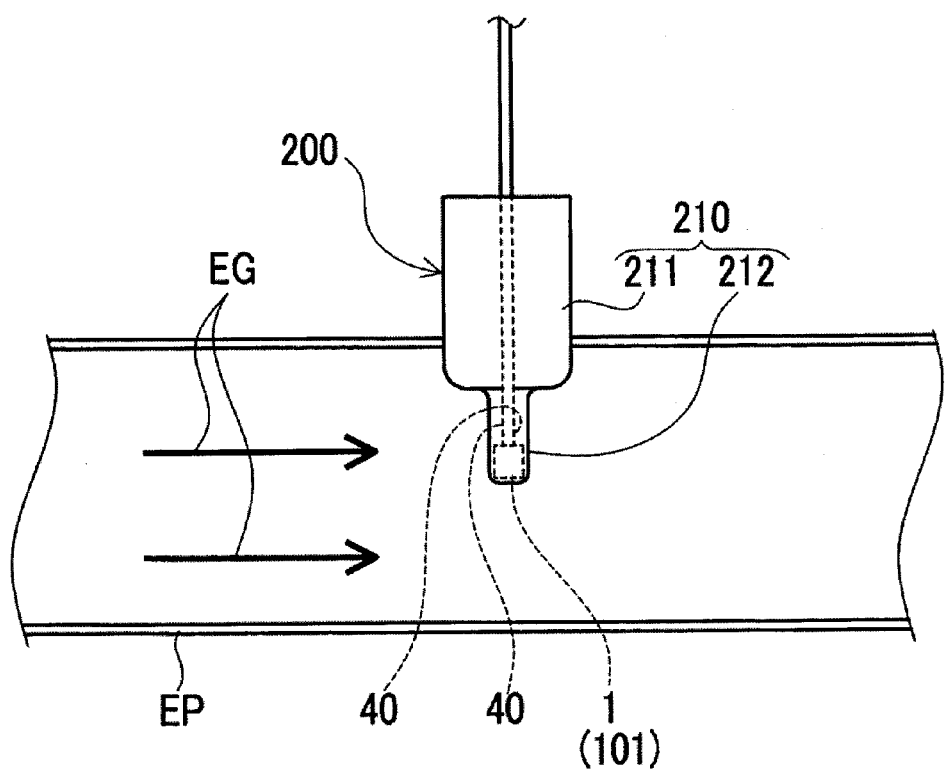
FIG. 9 is an explanatory view of a temperature sensor according to Embodiment 2.

This temperature sensor 200 includes the above-described thermistor element 1 according to Embodiment 1 (or the thermistor element 101 according to the modified embodiment), and a housing 210 which accommodates the thermistor element 1 (101) (see FIG. 9). The housing 210 is composed of a cylindrical tubular main body portion 211, and a cylindrical tubular projection portion 212 which projects from the main body portion 211 and which has a diameter smaller than that of the main body portion 211. The thermistor element 1 (101) is disposed inside the projection portion 212 so as to measure the temperature of an atmosphere around the projection portion 212.

Notably, the temperature sensor 200 of the present Embodiment 2 is used to measure the temperature of, for example, exhaust gas EG which is discharged from an engine (not shown) of a vehicle and flows through an exhaust pipe EP, as shown in FIG. 9. In this case, the main body portion 211 of the housing 210 is fixed to the wall of the exhaust pipe EP so that the projection portion 212 of the housing 210 is disposed inside the exhaust pipe EP (see FIG. 9).

Since the temperature sensor 200 of the present Embodiment 2 uses the above-described thermistor element 1 (101), the temperature sensor 200 is excellent in terms of reduction resistance and thermal responsiveness.

Next, the thermal responsiveness of temperature sensors 200 including the thermistor element 1, etc., of the above-described Examples 1 to 8 and Comparative Example 2 (which will be described below) were evaluated as follows.

First, each temperature sensor 200 was held in the atmosphere of room temperature (25° C.) for one hour. Subsequently, the temperature sensor was disposed in a flow channel though which a measurement gas (air) of 100° C. (gas temperature) was flowing at a flow velocity of 20 m/sec. As a result, the temperature detected by the temperature sensor 200 increased from an initial temperature corresponding to the room temperature, and became saturated at a saturation temperature close to the gas temperature. A temperature corresponding to 63% of the change (100%) of the temperature detected by the temperature sensor 200 from the initial temperature to the saturation temperature will be referred to as "63% temperature." A response time required for the detected temperature to increase from the initial temperature to the 63% temperature was measured. The number N of samples was set to 10 (N=10), and the average of the response times of the samples was calculated. Each of the temperature sensors of Examples and Comparative Example was determined, on the basis of the average response time, whether to have a satisfactory thermal responsiveness. Specifically, a temperature sensor whose average response time was shorter than 5 sec was evaluated to be "acceptable (O)," and a temperature sensor whose average response time was equal to or longer than 5 sec was evaluated to be "unacceptable (X)." The results are shown in the above-described Table 1.

Next, the thermistor element used in the temperatures sensor 200 will be described. However, since the thermistor elements of Examples 1 to 8 have already been described, their description will be omitted. In the thermistor elements of Examples 1 and 3 to 8, the second covering layer covers the extension-side outer surface V1 only. The thermistor element of Example 2 does not have the second covering layer.

Meanwhile, the thermistor element of Comparative Example 2 differs from the thermistor elements of Examples 1 to 8 (in which the second covering layer covers a portion of the first covering layer or the second covering layer is not provided) in the point that the second covering layer covers the entire surface of the first covering layer; i.e., the second covering layer covers not only the extension-side outer surface V1 but also the main-body-side outer surface V2 (see Table 1). In the case of the thermistor element of Comparative Example 2, after the first covering layer was formed on the thermistor main body in the same manner as the manner in Example 1, by means of dipping, paste containing glass powder was applied to cover the entire surface of the first covering layer, followed by firing, whereby the second covering layer was formed.

The thermistor elements of Examples 1 to 8 and Comparative Example 2 are assembled to temperature sensors, and the thermal responsivenesses of the temperature sensors were evaluated.

As shown in Table 1, the thermal responsiveness of the temperature sensor in which the thermistor element of Comparative Example 2 was used was unacceptable (X) (its response time was equal to or longer than 5 sec). In contrast, the thermal responsivenesses of the temperature sensors in which the thermistor elements of Examples 1 to 8 were used, respectively, were acceptable (O) (their response times were shorter than 5 sec). This shows that the temperature sensors in which the thermistor elements of Examples 1 to 8 are used are higher in thermal responsiveness than the temperature sensor in which the thermistor element of Comparative Example 2 is used. In the case of the thermistor element of Comparative Example 2 in which the second covering layer covers the entire surface of the first covering layer, since the second covering layer is formed on the outer surface on the thermistor main body side (the main-body-side outer surface V2: see FIG. 2) as well, conceivably, the transfer of external heat to the thermistor main body became slower as compared with the thermistor elements of Examples 1 to 8 in which the main-body-side outer surface V2 is not covered by the second covering layer. Also, conceivably, the transfer of external heat to the thermistor main became slower, because the thermal conductivity of amorphous glass used for the second covering layer is generally lower than that of crystallized glass.

It is found from the test results that providing the second covering layer 30 within only the extension-side outer surface V1 of the outer surface 20F of the first covering layer 20 is preferred to providing the second covering layer 30 on the main-body-side outer surface V2 in addition to the extension-side outer surface V1.

In the above, the present invention has been described on the basis of Embodiments 1, 2 and the modified embodiment. However, needless to say, the present invention is not limited to the above-described embodiments, etc., and may be changed freely without departing from the scope of the invention.

In Embodiment 1 and the modified embodiment, the entire periphery of a thermistor main body having a rectangular parallelepiped shape is covered by a first covering layer having a rectangular parallelepiped shape or a cylindrical shape, and the first covering layer is formed such that the exposed layer thickness measured by using any vertex of the rectangular parallelepiped thermistor main body as a starting point becomes equal to the smallest one of the exposed layer thicknesses measured by using, as starting points, points on the three sides and three flat surfaces which form the vertex. However, the thermistor elements of Embodiment 1 and the modified embodiment may be formed such that the exposed layer thickness measured by using each vertex of the rectangular parallelepiped thermistor main body as a starting point becomes greater than the smallest one of the exposed layer thicknesses measured by using, as starting points, points on the three sides and three flat surfaces which form the vertex.

In Embodiment 1 and the modified embodiment, the thermistor main body has a rectangular parallelepiped shape; i.e., the surfaces of the thermistor main body are rectangular, as shown in FIG. 4. However, the thermistor elements of Embodiment 1 and the modified embodiment may be formed such that the thermistor main body has a cubic shape; i.e., the surfaces of the thermistor main body are square.

Figure 10:
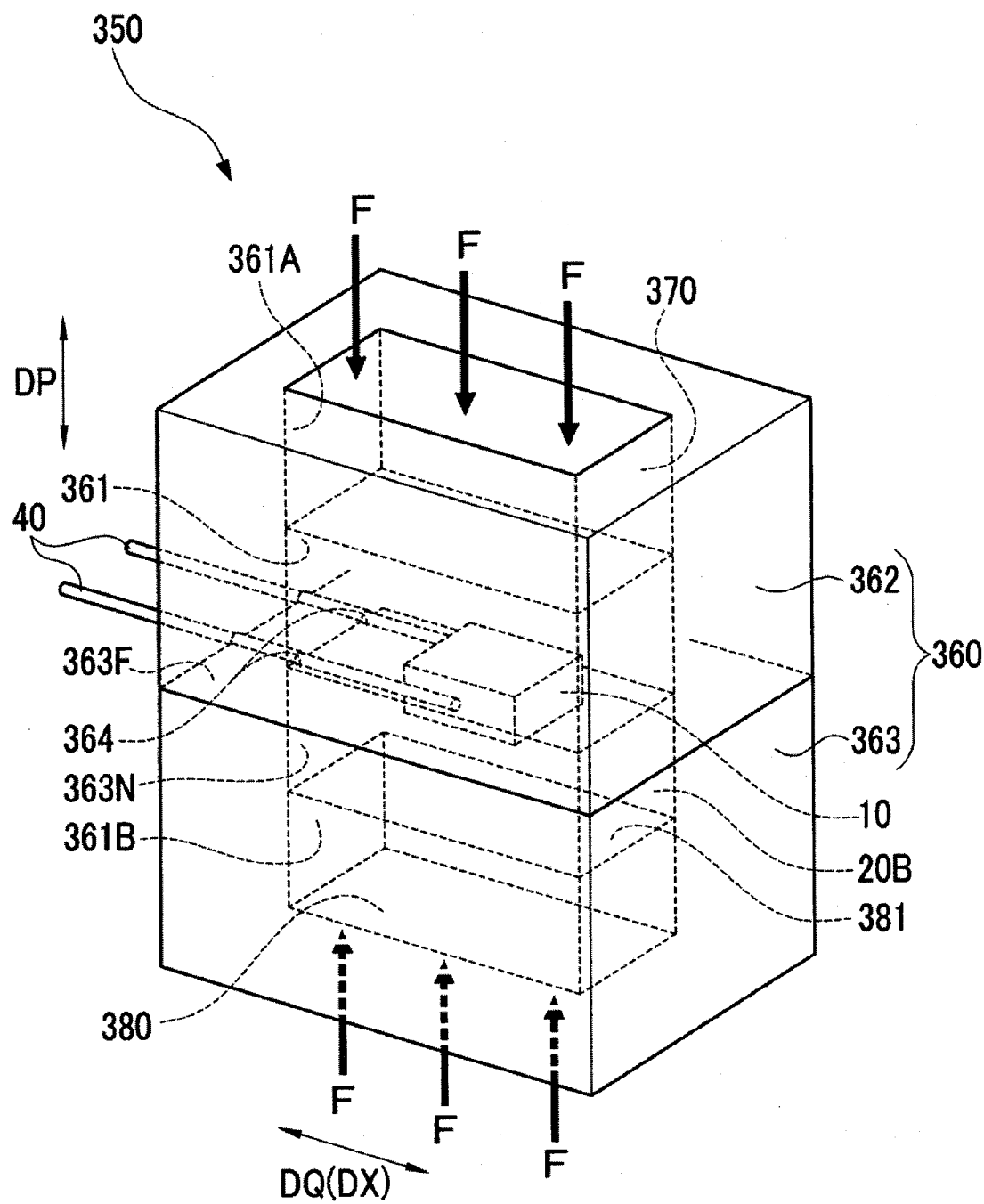
FIG. 10 is a view used for explaining a method for manufacturing the thermistor element according to a modification.

In Embodiment 1 and the modified embodiment, the press step is performed by using the die apparatus 50 shown in FIG. 5. However, the press step may be performed by using a die apparatus 350 shown in FIG. 10.

Specifically, this die 350 is composed of a rectangular tubular first die 360 having a through hole 361 extending in a first direction DP (the vertical direction in FIG. 10), and rectangular platelike second and third dies 370, 380 which close two openings (first and second opening 361A, 361B) of the first die 360.

The first die 360 is composed of an upper die 362 and a lower die 363, which can be fitted together in the first direction DP at the time of press forming. Each of the upper and lower dies 362, 363 has two grooves 364 which extend from the through hole 361 in a second direction DQ (the upper-left to lower-right direction in FIG. 10) orthogonal to the first direction DP. The two grooves 364 are semi-cylindrical grooves extending in the second direction DQ. When the upper and lower dies 362 and 363 are fitted together, the two grooves 364 surround the leads 40 connected to the thermistor main body 10.

The second die 370 is disposed in a first opening 361A of the first die 360 located on one side (upper side in FIG. 10) in the first direction DP so as to close the first opening 361A. The third die 380 is disposed in a second opening 361B of the first die 360 located on the other side (lower side in FIG. 10) in the first direction DP so as to close the second opening 361B.

In the press step, the third die 380 is first disposed in the second opening 361B of the lower die 363 so as to close the second opening 361B. Next, the thermistor main body 10 having the leads 40 connected thereto is disposed on the upper end surface 363F of the lower die 363. Specifically, the leads 40 are disposed in the two grooves 364 provided on the upper end surface 363F of the lower die 363. The upper die 362 is then disposed on the upper end surface 363F of the lower die 363. At that time, the two grooves 364 of the upper die 362 are aligned with the leads 40, whereby the leads 40 are surrounded by the grooves 364 of the upper die 362 and the grooves 364 of the lower die 363.

Subsequently, a predetermined amount of glass powder made of $SiO_2$—RO—$Al_2O_3$—$ZrO_2$ (R: alkaline earth metal) is charged into the space through the first opening 361A of the upper die 362.

After that, the first opening 361A of the first die 360 (the upper die 362) is closed by the second die 370, whereby the first die 360 is sealed. Further, external forces F are applied to the second die 370 and the third die 380 so as to press form the glass powder into a shape such that the glass powder encapsulates the thermistor main body 10. As a result, a green first covering layer 20B is formed inside the die apparatus 350 (the first die 360, the second die 370, and the third die 380) (see FIG. 10).

The first covering layer 20 can be formed by firing the green first covering layer 20B, as in the case of Embodiment 1 and the modified embodiment.

DESCRIPTION OF REFERENCE NUMERALS AND SYMBOLS

1, 101: thermistor element
10: thermistor main body
11A: first connection surface (flat surface, facing surface)
11B: second connection surface (flat surface, facing surface)
12A: first side surface (flat surface, end surface)
12B: second side surface (flat surface)
12C: third side surface (flat surface)
12D: fourth side surface (flat surface)
13A-13D: first through fourth sides (sides)
14A-14D: fifth through eighth sides (sides)
15A-15D: ninth through twelfth sides (sides)
16A-16D: first through fourth vertexes (vertexes)
17A-17D: fifth through eighth vertexes (vertexes)
20, 120: first covering layer
20B: green first covering layer
20F, 120F: outer surface
20R, 120R: exposed outer surface
20ST, 120ST: surrounding outer surface portion (portion of the first covering layer)
21-26: first through sixth flat surfaces (flat surfaces)
30, 130: second covering layer
40: lead
42E: adjacently existing portion (portion of the lead)
121, 122: first and second flat surfaces (pair of flat surfaces)
200: temperature sensor
DX: extending direction
V1: extension-side outer surface (outer surface)
VE: interface

The invention claimed is:

1. A thermistor element comprising:
    a thermistor main body made of an electrically conductive sintered oxide and having a rectangular parallelepiped shape; and
    a first covering layer which has reduction resistance, said first covering layer covering an entire periphery of the thermistor main body and having an outer surface, at least a portion of which is an exposed outer surface exposed to the outside, wherein
    when a shortest distance in a straight line in the first covering layer extending from a starting point on the thermistor main body to the exposed outer surface is defined as an exposed layer thickness at the starting point,
    the first covering layer is formed such that the exposed layer thickness measured by using any vertex of the rectangular parallelepiped thermistor main body as a starting point is equal to or greater than the smallest one of exposed layer thicknesses measured by using, as starting points, points which are other than the vertex and are located on three sides and three flat surfaces which form the vertex.

2. The thermistor element according to claim 1, further comprising:
    a plurality of leads which are connected to the thermistor main body and extend through the first covering layer and project therefrom; and
    a second covering layer which has reduction resistance and is made of a material different from the material of the first covering layer, wherein
    the second covering layer covers a portion of each lead and a portion of the first covering layer to thereby airtightly close interfaces between the leads and the first covering layer.

3. The thermistor element according to claim 2, wherein
    the leads are a pair of leads which are respectively connected to facing surfaces of the thermistor main body facing each other via one end surface of the thermistor main body and extend in the same direction beyond the end surface; and
    the second covering layer is formed within an extension-side outer surface which is a portion of the outer surface of the first covering layer, said extension-side outer surface being located outward of the end surface with respect to an extending direction of the leads.

4. The thermistor element according to claim 2, wherein a relation of X1>X2 and a relation of X3>X2 are satisfied, where X1 represents a coefficient of thermal expansion of the first covering layer, X2 represents a coefficient of thermal expansion of the second covering layer, and X3 represents a coefficient of thermal expansion of the leads.

5. The thermistor element according to claim 4, wherein
    a difference (X1−X2) between the coefficient of thermal expansion X1 of the first covering layer and the coefficient of thermal expansion X2 of the second covering layer satisfies a relation of $(X1-X2) \leq 15 \times 10^{-7}/°C$.; and
    a difference (X3−X2) between the coefficient of thermal expansion X3 of the leads and the coefficient of thermal expansion X2 of the second covering layer satisfies a relation of $(X3-X2) \leq 15 \times 10^{-7}/°C$.

6. The thermistor element according to claim 2, wherein the second covering layer is made of glass or a mixture of glass and metal oxide particles.

7. The thermistor element according to claim 6, wherein the glass which forms the second covering layer is amorphous glass.

8. The thermistor element according to claim 1, wherein the first covering layer is made of glass or a mixture of glass and metal oxide particles.

9. The thermistor element according to claim 8, wherein the glass which forms the first covering layer is crystallized glass.

10. The thermistor element according to claim 1, wherein the first covering layer has a rectangular parallelepiped outer shape and has flat surfaces parallel to flat surfaces of the rectangular parallelepiped thermistor main body.

11. The thermistor element according to claim 1, wherein the first covering layer has a circular columnar outer shape and has a pair of flat surfaces which are parallel to a pair of flat surfaces of the rectangular parallelepiped thermistor main body, said flat surfaces facing each other.

12. A temperature sensor which comprises a thermistor element according to claim 1.

13. A method of manufacturing a thermistor element including a thermistor main body made of an electrically conductive sintered oxide and having a rectangular parallelepiped shape, and a first covering layer which has reduction resistance, said first covering layer covering an entire periphery of the thermistor main body and having an outer surface, at least a portion of which is an exposed outer surface exposed to the outside, wherein when a shortest distance in a straight line in the first covering layer extending from a starting point on the thermistor main body to the exposed outer surface is defined as an exposed layer thickness at the starting point, the first covering layer is formed such that the exposed layer thickness measured by using any vertex of the rectangular parallelepiped thermistor main body as a starting point is equal to or greater than the smallest one of exposed layer thicknesses measured by using, as starting points, points which are other than the vertex and located on three sides and three flat surfaces which form the vertex, the method comprising the steps of:

press forming a green first covering layer, which is to become the first covering layer through firing, into a shape for encapsulating the thermistor main body; and firing the green first covering layer to thereby form the first covering layer.

\* \* \* \* \*